United States Patent
Perlman et al.

[11] Patent Number: 6,156,354
[45] Date of Patent: Dec. 5, 2000

[54] HYPER-ABSORPTION OF VITAMIN E DISPERSED IN MILKS

[75] Inventors: Daniel Perlman, Arlington; Kenneth C. Hayes, Wellesley, both of Mass.

[73] Assignee: Brandeis University, Waltham, Mass.

[21] Appl. No.: 09/325,258

[22] Filed: Jun. 3, 1999

Related U.S. Application Data

[60] Provisional application No. 60/117,847, Jan. 29, 1999.

[51] Int. Cl.[7] .................................................. A23L 1/302
[52] U.S. Cl. ......................... 426/72; 426/519; 426/580; 426/585; 424/439
[58] Field of Search ............................. 426/72, 580, 585, 426/519; 424/439

[56] References Cited

U.S. PATENT DOCUMENTS

| | | | |
|---|---|---|---|
| 5,063,074 | 11/1991 | Kahn et al. | 426/585 |
| 5,393,551 | 2/1995 | Arcadipane | 426/585 |
| 5,514,407 | 5/1996 | Perlman et al. | 426/607 |
| 5,578,334 | 11/1996 | Sundram et al. | 426/2 |
| 5,580,600 | 12/1996 | Strong et al. | 426/585 |
| 5,843,497 | 12/1998 | Sundram et al. | 426/2 |

OTHER PUBLICATIONS

Kuzdzal–Savoie et al. "Increase in the Level of Linoleic Acid in Cow's Milk Fat," Revista Italiana Delle Sustanze Grasse, 52 (1) 29–31, (Abstract), 1975.

Acuff et al., "Relative bioavailability of RRR–and all–rac–α–tocopheryl acetatein humans: Studies using deuterated compounds," Am. J. Clin. Nutr. 60:397–402 (1994).

Balla et al., "Hemin: A possible physiological mediator of low density lipoprotein oxidation and endothelial injury," Arterioscler. Thromb. 11:1700–1711 (1991).

Berson et al., "A randomized trial of vitamin A and Vitamin E supplementation for retinitis pigmentosa," Arch. Ophthalmol. 111(6):761–772 (1993).

Bieri et al., "Simultaneous determination of α–tocopherol and retinol in plasma or red cells by high pressure liquid chromatography," Am. J. Clin. Nutr. 32:2143–2149 (1979).

Dickson, The Benefits of Nutritional Supplements, Council for Responsible Nutrition p. 47 (1998).

Dimitrov et al., "Plasma α–tocopherol concentrations after supplementation with water–and fat–soluble vitamin E," Am. J. Clin. Nutr. 64:329–335 (1996).

Dimitrov et al., "Plasma tocopherol concentrations in response to supplemental vitamin E," Am. J. Clin. Nutr. 53:723–729 (1991).

(List continued on next page.)

Primary Examiner—Helen Pratt

[57] ABSTRACT

A milk product including a level of vitamin E per serving of said product which can conveniently provide at least 100 IU of vitamin E per day to an individual ingesting the product. The vitamin E is uniformly microdispersed throughout the product, and ingestion of at least 100 IU of vitamin E per day in the product is sufficient to cause the fasting plasma vitamin E/cholesterol ratio in human subjects to be elevated at least 50% above the basal fasting level of vitamin E measured in the same subjects consuming no vitamin E dietary supplements. A method for elevating the plasma vitamin E level at least 50% in human subjects is also described. The method includes ingesting a milk product as described.

44 Claims, 1 Drawing Sheet

OTHER PUBLICATIONS

Esterbauer et al., "The role of lipid peroxidation and antioxidants in oxidative modification of LDL," *Free Radic. Biol. Med.* 13:341–390 (1992).

Friedewald et al., "Estimation of the concentration of low–density lipoprotein cholesterol in plasma, without use of the preparative ultracentrifuge," *Clin. Chem.* 18:499–502 (1972).

Hof et al., "Antioxidant fortified margarine increases the antioxidant status," *Eur. J. Clin. Nutr.* 52:292–299 (1998).

Jialal et al., "The effect of α–tocopherol supplementation on LDL oxidation: A dose response study," *Arterioscler. Thromb. Vasc. Biol.* 15:190–198 (1995).

Katan et al. "Health effects of trans fatty acids," *Eur. J. Clin. Invest.* 28:257–258 (1998).

Losocnzy et al., "Vitamin E and vitamin C supplement use and risk of all–cause and coronary heart disease mortality in older persons: The established populations for epidemiologic studies of the elderly," *Am. J. Clin. Nutr.* 64:190–196 (1996).

Machlin, (ed.) Part 5 "Biochemistry" *Vitamin E: A Comprehensive Treatise* Marcel Dekker, Inc. New York and Basel pp. 169–192 (1980).

Meydani et al., "Assessment of the safety of supplementation with different amounts of vitamin E in healthy older adults," *Am. J. Clin. Nutr.* 68:311–318 (1998).

Meydani et al., "Effect of age and dietary fat (fish, corn and coconut oils) on tocopherol status of C57BL/6Nia mice," *Lipids* 22:345–350 (1987).

Mitchell et al., "Bioavailability for rats of vitamin E from fortified breakfast cereals," *J. Food Sci.* 61:1257–1260 (1996).

Princen et al., "Supplementation with low doses of vitamin E protects LDL from lipid peroxidation in men and women," *Arterioscler. Thromb. Vasc. Biol.* 15:325–333 (1995).

Pronczuk et al., "Dietary myristic, palmitic, and linoleic acids modulate cholesterolemia in gerbils," *FASEB J.* 8:1191–1200 (1994).

Rimm et al., "Vitamin E consumption and the risk of coronary heart disease in men," *New England Journal of Medicine* 328:1450–1456 (1993).

Stampfer et al., "Vitamin E consumption and the risk of coronary disease in women," *New England Journal of Medicine* 328:1444–1449 (1993).

Stephens et al., "Randomised controlled trial of viatmin E in patients with coronary disease: Cambridge heart antioxidant study (CHAOS)," *Lancet* 347:781–786 (1996).

Terpstra et al., "Improved techniques for the separation of serum lipoprotein by density gradient ultracentrifugation: Visualization by prestaining and rapid separation of serum lipoproteins from small volumes of serum," *Anal. Biochem.* 111:149–157 (1981).

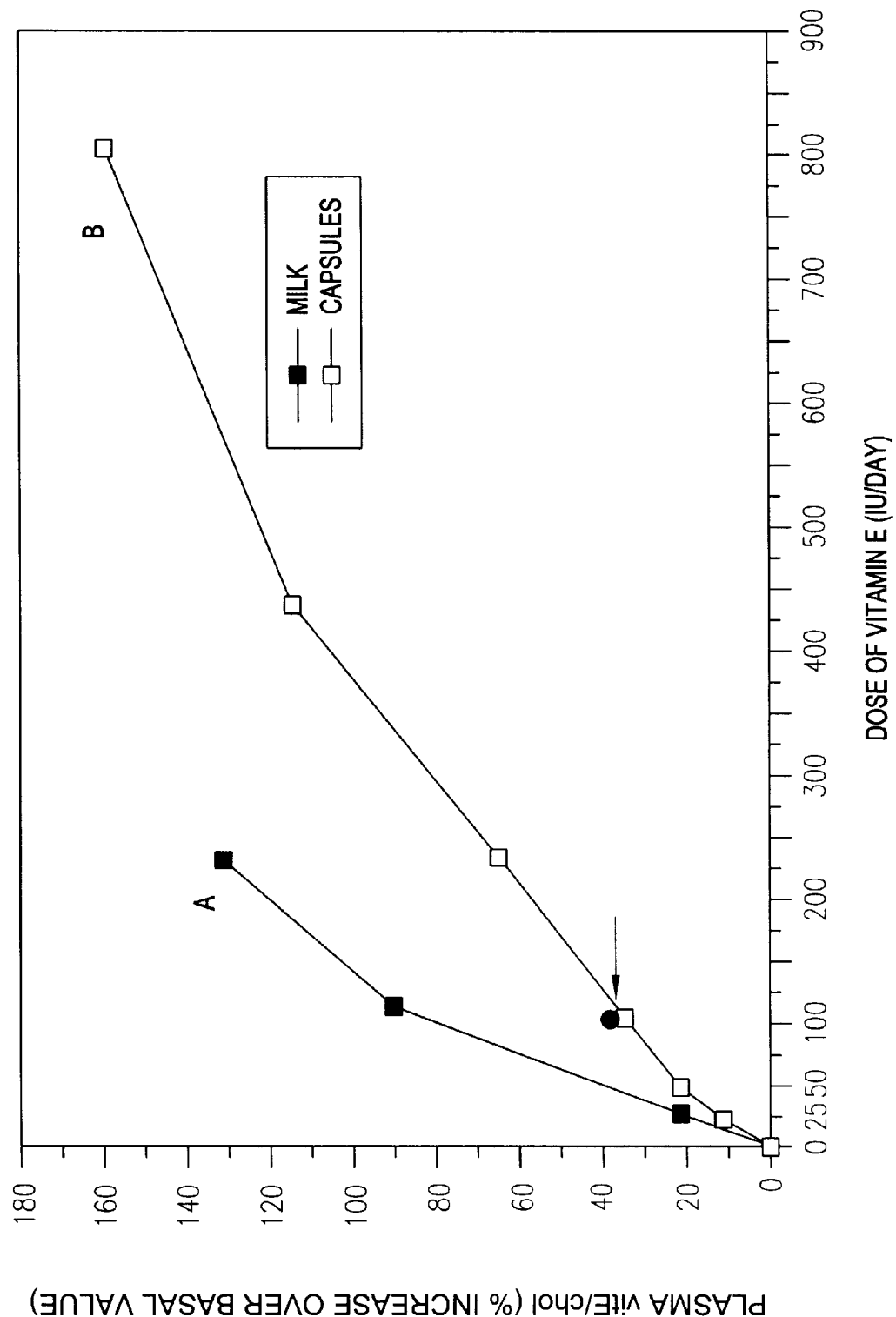

HYPER-ABSORPTION OF VITAMIN E DISPERSED IN MILKS

RELATED APPLICATIONS

This application claims the benefit of U.S. Provisional Application No. 60/117,847, filed Jan. 29, 1999, entitled HYPER-ABSORPTION OF VITAMIN E DISPERSED IN MILK, which is hereby incorporated by reference in its entirety.

BACKGROUND OF THE INVENTION

This invention relates to milk-based food products, and in particular to the microdispersal of vitamin E in milks (milkfat-based milk, skim milk, vegetable oil-filled milk, and blends thereof) at a level providing at least 31 IU (International Units) per serving.

The information provided herein is solely to assist the understanding of the reader; none of that information or cited references is admitted to be prior art to the present invention.

In the past five years several major prospective health studies have been published demonstrating that vitamin E supplement ingestion is associated with a reduced risk of coronary heart disease (CHD) in both women and men (e.g., Stampfer et al., NEJM, 328 1444–1449, 1993 Rimm et al., NEJM, 328, 1450–1456, 1993). In a four year study of nearly 40,000 males, Rimm et al., showed that the risk of CHD diminished significantly as the daily supplemental level of vitamin E increased. This study indicates that the current Recommended Daily Allowance (RDA) of 30 international units (IU) of vitamin E is insufficient for obtaining the full protective benefits of vitamin E. In fact, the study data suggest that for most adult males, a daily supplement of at least 100 IU of vitamin E is appropriate for helping to protect against CHD. In another prospective study, long-term ingestion of vitamin E was tested for its ability to reduce the incidence of myocardial infarction in patients having a documented condition of coronary atherosclerosis (Stephens et al., Lancet, 347, 781–786, 1996). In this study, it was shown that sustained supplementation of the patients' diets with 400 IU of RRR-α-tocopherol ingested once per day in capsules was sufficient to reduce the risk of non-fatal heart attacks by 77%. This protective effect became apparent after about 200 days of treatment with the vitamin. In still another study (Losonczy et al., Am. J. Clin. Nutr. 64, 190–196, 1996), individuals in an elderly population (n=11, 178) aged 67–105, were each followed for 6 years, and their uses of vitamin E and/or vitamin C supplements were correlated with their risk of developing cancer and CHD. While vitamin C supplements could not be shown to have a significant protective effect over the 6 year period, vitamin E supplements (greater than 100 IU per day) were shown to reduce all-cause mortality 27–34%, CHD mortality 41–47%, and cancer mortality 22–23% (in these ranges, the first number is the age and sex-adjusted risk, and the second is a multi-covariable adjusted risk).

Many other studies have shown the beneficial function of vitamin E for protecting plasma LDL cholesterol and cellular components against oxidative damage, and for maintaining normal immunological function to protect the body against disease. It has also been shown in an 88 subject study, that even high daily doses of vitamin E ingested by healthy elderly people for extended periods of time (i.e., 800 IU per day for 4 months), caused no side-effects, no negative changes in general health or metabolic functions based upon an extensive battery of blood tests (Meydani et al., Am. J. Clin. Nutr. 68: 311–318, 1998). By contrast, significant improvements in T cell mediated function and significant increases in plasma vitamin E levels were noted. In that study, subjects consuming 800 IU of vitamin E per day for 4 months, reached plasma vitamin E levels of up to 71.5 $\mu$mol per liter (3075 $\mu$g per deciliter). This 3000 $\mu$g per deciliter level is usually considered the "saturation level" for vitamin E transport by lipoproteins in humans regularly consuming high doses of vitamin E, and is essentially 3.0× the basal fasting plasma level of vitamin E (800–1000 $\mu$g per deciliter) measured in the general population consuming no vitamin E dietary supplements.

As a result of a consensus in the scientific community on the benefits of supplemental vitamin E, a number of "structure-function" health claims for vitamin E have been approved under the Dietary Supplement Health and Education Act (DSHEA) in the U.S. While the DSHEA does not encompass foods per se, in the last five years a number of food products supplemented or "fortified" with low levels of vitamin E have come to market. By the term "low levels" it is meant that these foods provide quantities of vitamin E which are less than or equal to the current RDA of 30 IU of vitamin E per serving of the food. Typically, vitamin E is added to foods in one of its more chemically stable forms, e.g., α-tocopherol acetate (also known as α-tocopheryl acetate). Four different forms of vitamin E (the alcohol and ester forms of synthetic racemic (rac) vitamin E and the alcohol and ester forms of natural (RRR) vitamin E) are commercially available, and because of their differences in bioactivities and molecular weights, are assigned different values of specific activity (IU per milligram) according to the National Formulary as follows:

1 mg all-rac-α-tocopherol acetate=1.00 IU
1 mg all-rac-α-tocopherol=1.10 IU
1 mg RRR-α-tocopherol acetate=1.36 IU
1 mg RRR-α-tocopherol=1.49 IU In a separate area of nutritional biochemistry, Perlman et al. in U.S. Pat. No. 5,514,407 combined vegetable oils rich in polyunsaturated fatty acids, with cholesterol-reduced animal fats rich in saturated fatty acids to produce oxidation-resistant fat blends containing 1–10 parts by weight of the animal fat to 1 part of vegetable oil. These blends showed favorable nutritional characteristics in mammals, including a decreased total serum cholesterol level, and a decreased LDL/HDL cholesterol ratio in humans. In Sundram et al., U.S. Pat. No. 5,578,334 and Sundram et al., U.S. Pat. No. 5,843,497 (which are hereby incorporated by reference in their entireties including drawings), certain vegetable oils such as soybean oil, rich in polyunsaturated fatty acids, were combined with palm oil, rich in saturated fatty acids, to produce dietary fat blends containing approximately equal proportions of saturated and polyunsaturated fatty acids (hereinafter termed "balanced fats"). Compared to diets in which one class of fatty acids predominates (polyunsaturated, monounsaturated or saturated), if such balanced fats are consumed as the principal dietary fat (at approximately 30% of dietary calories supplied as fat), the ratio of plasma LDL to HDL cholesterol is beneficially reduced. At the same time, HDL levels are beneficially sustained or increased.

SUMMARY OF THE INVENTION

The present invention concerns the surprising discovery that absorption of vitamin E into the human bloodstream from milk is unexpectedly efficient compared with vitamin E absorption from other foods or from pharmaceutical preparations of vitamin E (e.g., capsules) and, therefore, further concerns the use of regular milk (with milkfat), skim milk (fat-free) and filled milk (milkfat being partially or fully substituted by vegetable oil) and other milk-based or milk-derived dairy products as carrier vehicles for microdispersed vitamin E. For example, the plasma level of vitamin E resulting from daily ingestion of 100 IU of vitamin E dispersed in milk is approximately equal to the plasma level of vitamin E which would result from daily ingestion of 300 IU per day in the form of a soft gel capsule. Furthermore, this enhanced effect with milk is surprisingly independent of the type of fat or even the amount of fat present in the milk. As a result of the highly efficient absorption of vitamin E from milk, milk provides a cost-effective means for supplementing vitamin E in the diet at a level sufficient to obtain the health benefits associated with high level vitamin E supplementation. In addition, providing vitamin E at those levels provides a delivery mechanism which would be much better accepted by many individuals than taking vitamin pills daily.

Thus, the invention involves the following interconnected discoveries:

(i) When vitamin E is microdispersed in milk, fat is not required in the milk product for hyper-efficient vitamin E absorption into the bloodstream. Thus, vitamin E dispersed in skim milk is as hyper-efficiently absorbed into the bloodstream as vitamin E dispersed in regular 1% milk.

(ii) The presence of a substantial proportion of polyunsaturated fats such as soybean oil, which generally inhibit vitamin E absorption, have been shown to produce no such inhibitory effect when co-dispersed with vitamin E in milk. Thus, non-hydrogenated polyunsaturated vegetable oil-containing filled milks can serve as efficient carriers for vitamin E supplements.

(iii) Ingestion of a vitamin E dose microdispersed in milk was found to be approximately 2–3 times more effective than the same dose ingested in capsule form for vitamin E doses exceeding approximately 50 IU per day. Thus, ingesting 100 IU of all-rac-α-tocopherol acetate microdispersed in milk for 2–4 weeks demonstrated an equivalency of ingesting 300 IU of the same vitamin in the form of soft gel capsules in terms of elevating plasma and LDL levels of vitamin E.

(iv) Ingestion of a vitamin E dose of less than 50 IU per day microdispersed in milk, had a diminishing advantage over the same dose ingested in capsule form. In fact, with a dose of 30 IU vitamin E per day, it has been calculated that milk provides at most only a 38% greater increase (which is not a statistically significant increase) in the ratio of vitamin E/cholesterol than that which would achieved by ingesting one 30 IU vitamin E capsule.

(v) A dose of vitamin E microdispersed in orange juice was found to be much less efficiently absorbed and/or absorbed into lipoproteins than the same dose microdispersed in milk. In fact, with 200 IU of all-rac-α-tocopherol acetate provided daily in orange juice, the increase in plasma vitamin E after 4 weeks was less than that achieved with 100 IU provided daily in milk.

In contrast to prior art products, dairy products described in the present invention provide at least 31 IU of vitamin E per serving, preferably at least 40 IU per serving, and more preferably provide at least 50 IU per serving, allowing convenient consumption of at least 100 IU per day. This daily consumption of vitamin E is significantly greater than the Food and Drug Administration's current recommended daily allowance (RDA) of 30 IU of the vitamin (1.0 IU=1.0 mg all-rac-α-tocopherol acetate). Remarkably, the 92% average increase in the ratio of vitamin E/cholesterol in the bloodstream as a result of ingesting 100 IU microdispersed in milk each day significantly exceeds the rise resulting from ingesting even 200 IU of vitamin E in capsules each day, and approximates that rise expected from ingesting 300 IU per day in capsules (see FIG. 1 and Princen et al., 1995 *Arterioscler. Thromb. Vasc. Biol.*, 15:325–333) Princen et al., showed that 200 IU vitamin E (all-rac-α-tocopherol acetate) capsules increased the plasma vitamin E/cholesterol ratio 65%.

Despite the clinical knowledge that ingesting vitamin E in soft gel capsules at levels substantially in excess of 30 IU per day provides very significant health benefits with no undesirable side-effects, Applicants have been unable to find any food products containing vitamin E in excess of 30 IU per serving for delivery of vitamin E supplements. This can be explained by the recognition of those skilled in the art of the losses of vitamin E associated with the processing and storage of the food products, discouraging the introduction of any higher level of vitamin E into commercial foods, along with the lack of knowledge that milk provides a highly efficient delivery medium. That is, prior to the present discovery, there had been no finding, report or other evidence indicating that adding, dispersing or otherwise combining vitamin E with any food or beverage such could increase its bioavailability over other delivery modes.

To the contrary, results of experiments testing the bioavailability of a vitamin E dose in margarine or in a breakfast cereal were shown to be very similar to that of a simple supplement, e.g., in a capsule. Then, discouraging adding higher levels of vitamin E to foods (as more fully explained below), mixing, heat processing, e.g., pasteurization, and storing vitamin E in a food inevitably leads to significant losses (typically 25–35%) in its potency, i.e., the vitamin E is degraded. Indeed, it is generally recognized that tocopherols are usually added to food as antioxidants precisely due to their lability to oxidation, such that the tocopherol serves as a sacrificial compound to protect other compounds from oxidation (e.g., to retard the development of rancidity in oils). Therefore, it is generally understood that to obtain the maximum health benefit from larger doses of vitamin E, particularly from costly amounts of the vitamin, e.g., levels in excess of 30 IU per serving, the vitamin should be provided, stored and consumed in a more stable carrier or vehicle, such as in a gel capsule or tablet. With such a carrier, in the absence of any substances which may cause oxidative degradation, the activity of vitamin E can be maintained for many months. It is only with knowledge of hyper-absorption of vitamin E from milk, as disclosed in the present invention, that a reason or justification is created to add higher levels of vitamin E to milk products.

Accordingly, in a first aspect this invention provides a method for providing a composition suitable for reducing the daily ingested dose of vitamin E required for achieving at least a 50% increase in the plasma vitamin E/cholesterol ratio over the basal fasting plasma vitamin E/cholesterol ratio measured in the plasma of human subjects previously consuming no vitamin E dietary supplements. The method involves microdispersing vitamin E in a milk product, preferably a liquid milk product at a concentration sufficient to provide between 50 and 400 IU of vitamin E per serving of the milk product, measured after normal processing of the milk product, and preferably after storage under normal conditions for the normal shelf life for the product. The method also involves processing and packaging the product to provide a consumer-ready milk product having an adequate shelf-life. The reduction in the amount of vitamin E required is determined by comparison of the amount of vitamin E required to achieve the increase when ingested in the milk product with the amount of vitamin E required to achieve the same increase when ingested in a pharmaceutical preparation.. The beneficial savings or reduction in the amount of vitamin E required for achieving the at least 50% increase, is at least 1.5-fold greater than the loss of vitamin E incurred during processing of the milk product. The pharmaceutical preparation refers to preparations of vitamin E in forms such as pills and capsules, e.g., a soft gel capsule. Preferably the milk product contains from 50 to 300, and most preferably from 50 to 200 IU per serving of the milk product after normal processing of the milk product. The method further involves processing and packaging the milk product to provide a consumer-ready milk product having an adequate shelf-life. The reduction in the amount of vitamin E required to provide the at least 50% increase over the basal plasma vitamin E/cholesterol ratio is greater, and preferably substantially greater than the loss involved in processing, preferably the reduction is at least 1.25 times the processing loss, more preferably at least 1.5 times, still more preferably at least 1.75 times, and most preferably at least 2.0 times the processing loss. Preferably the processing loss includes the storage loss during storage of the milk product under normal storage conditions for a normal shelf life period.

Likewise, the invention provides a method for reducing the amount of ingested vitamin E required to provide the specified increase in the plasma vitamin E/cholesterol ratio over the basal plasma vitamin E/cholesterol ratio by ingesting daily an amount of the milk product described above, sufficient to provide at least 50 IU of vitamin E. The ingestion of at least that amount is preferably continued for at least 200 days, and more preferably more than 200 days.

In other embodiments, the milk product is as described for embodiments of aspects below which comply with the specification of this aspect.

In preferred embodiments of this and the other aspects of this invention, the milk product is preferably a fluid milk product.

In connection with the specification of levels of vitamin E in a milk product, the phrases "from 50 to 200" and "between 50 and 200" have the same meaning, referring to all levels from and including 50 up to and including 200. The same interpretation applies to any other numerical limits for ranges specified herein.

In another aspect, the invention provides a food-based vitamin E delivery system for achieving and sustaining a doubling of the basal fasting vitamin E/cholesterol ratio measured in the plasma of human subjects previously consuming no vitamin E dietary supplements. The food-based system includes a milk product fortified with from 50 to 400, preferably from 50 to 200, IU per serving of microdispersed vitamin E, providing a bioavailability-enhanced and cost-effective amount of supplemental vitamin E, where daily ingestion of an amount of the milk product sufficient to provide a dose of 100 IU achieves and sustains the doubling of the ratio. Preferably the daily dose of supplemental vitamin E microdispersed in the milk product required to achieve and sustain the doubling is ⅓ to ½ of the amount which would be required to achieve and sustain the doubling when ingested daily in the form of a capsule or pill. Preferably the milk product is a fluid milk product; preferably the milk product is substantially free of viable microorganisms. In preferred embodiments, the milk product is as described in aspects below which also fulfill the specifications of this aspect.

The term "bioavailability-enhanced" refers to an enhancement of bioavailability of vitamin E as compared to the bioavailability of the same form of viatmin E from a pharmaceutical preparation, e.g., from a soft gel capsule. The enhanced bioavailability allows the use of a reduced amount of vitamin E to produce the same enhancement of plasma vitamin E/cholesterol ratio as compared to delivery of the vitamin E is such a pharmaceutical preparation.

The term "cost-effective" refers to the relative cost of providing vitamin E supplementation in milk as compared to current formulations of capsule forms, e.g., soft gel capsules, on the basis of equivalent bioavailability or basal fasting vitamin E/cholesterol ratio increases. Thus, a cost-effective milk product or vitamin E deliver system allows a smaller amount of vitamin E to be utilized, including processing and storage losses for normal shelf-life time periods.

Likewise, in a related aspect, the invention provides a cost-effective method for doubling the basal fasting vitamin E/cholesterol ratio in the plasma of human subjects previously consuming no vitamin E dietary supplements by providing a milk product as in the preceding aspect, and ingesting and continuing to ingest daily an amount of the milk product sufficient to provide at least 90 IU of vitamin E, and preferably at least 100 IU. Preferably the doubling of the basal fasting vitamin E/cholesterol ratio causes a decrease in the rate of LDL cholesterol oxidation in the bloodstream. Such a reduction in oxidation reduces the concomitant risk of atherosclerosis and coronary heart disease.

Also similarly, the invention provides a method for improving the economy of utilizing supplemental vitamin E in the human diet by providing and ingesting daily a sufficient amount of a milk product containing 50 to 400, preferably from 50 to 200 IU per serving of microdispersed vitamin E to provide at least 50 IU daily, rather than ingesting 2–3 times the amount in capsule form. In preferred embodiments, the milk product provides a 2–3-fold increase in bioavailability over the capsule form of vitamin B such that the increase in bioavailability outweighs the losses in vitamin E activity during processing and storage of the milk product. That is the reduction in the amount of vitamin E need to achieve a particular increase in vitamin E/cholesterol ratio is greater than the processing loss (as either amount or percentage). Preferably the ratio of beneficial reduction to undesirable loss is at least 1.25, 1.5, or 1.75.

In a related aspect, the invention features a milk product which includes at least 40 IU, and more preferably at least 50 IU of vitamin E per serving of the product and in other preferred embodiments at least 60, 80, 100, or even more IU of vitamin E per serving (e.g., 200, 300, 400 or 600). The product can conveniently provide at least 100 IU of vitamin E per day to an individual ingesting between ⅓ and two servings of the product (e.g., ½, 1, 2, 3, or 4 depending on the actual concentration of vitamin E in the product) though additional product can also be ingested to provide additional vitamin E. The vitamin E is uniformly microdispersed throughout the product. Ingestion of at least 100 IU of vitamin E per day in the product is sufficient to cause the fasting plasma vitamin E/cholesterol ratio in human subjects to be elevated at least 50% (and typically 80–90%) above the basal fasting vitamin E/cholesterol ratio measured in the same subjects consuming no vitamin E dietary supplements. Generally the elevation in vitamin E/cholesterol ratio approaches a plateau after approximately two weeks of daily ingestion of vitamin E fortified milk. Between two and four weeks, the ratio may still increase, but the proportion of increase is small (typically 5–20%) relative to the increase already achieved by two weeks.

In preferred embodiments of this and other aspects of this invention, the milk product is selected from the group of products including whole milk, reduced-fat milk, low-fat milk, skim milk, vegetable oil-filled milk, blended vegetable oil and milkfat-filled milk, lactose-reduced milk (milk in which some or all of the disaccharide milk sugar, lactose, has been enzymatically converted to the monosaccharides, glucose and galactose), butter milk, flavored milk, dairy-containing beverages, yoghurt, cream, sour cream, ice cream, cream cheese, cottage cheese, hard and soft cheeses (e.g., cheddar, Swiss and mozzarella), processed cheese (e.g., American cheese) butter and butter-containing spreads, puddings, egg nog, powdered and reconstituted milk, concentrated milk, condensed milk, milk-based infant forumla, and the like.

In preferred embodiments, ingestion of at least 100 IU of vitamin E in the product (e.g., ingestion of 1 to 2 servings) is sufficient to cause the fasting plasma vitamin E/cholesterol ratio to be elevated at least 60% above the basal fasting vitamin E/cholesterol ratio measured in the same subjects consuming no vitamin E dietary supplements. In related embodiment, ingestion of at least 100 IU of vitamin E in the product (e.g., ingestion of 1, 2, 3, or 4 servings) is sufficient to cause the fasting plasma vitamin E/cholesterol ratio to be elevated at least 70%, 80%, or 90% above the basal fasting vitamin E/cholesterol ratio measured in the same subjects consuming no vitamin E dietary supplements.

In preferred embodiments, the milk product includes from 50 to 200, or from 100 IU to 400 IU of vitamin E per serving or from 70 to 200 IU of vitamin E per serving.

In preferred embodiments, ingestion of 100 IU of vitamin E per day in the product (e.g., ingestion of 1 to 2 servings) is sufficient to cause the fasting plasma vitamin E/cholesterol ratio to be elevated above the basal fasting ratio, to at least that ratio measured for subjects ingesting 200, and more typically 300, IU of vitamin E each day in the form of a pharmaceutical (pharmacological) supplement (e.g., a capsule containing vitamin E). The pharmaceutical supplement is orally ingested each day as either a single or a divided dosage, and is selected from the group consisting of capsules, pills, powders, and liquid preparations of vitamin E (not dispersed in a food product as vitamin E fortification).

In another preferred embodiment, ingestion of 100 IU of vitamin E per day in the product (e.g., ingestion of 1 to 2 servings) is sufficient to cause the fasting plasma level of vitamin E to be elevated between 700 and 1000 micrograms per deciliter (16–23 $\mu$mol per liter) above the basal fasting level measured in the same subjects ingesting no vitamin E supplement. In related embodiments, the elevated plasma level of vitamin E is between 1700 and 2000 micrograms per deciliter.

In preferred embodiments the chemical form of the vitamin E in the milk product is selected from the group consisting of all-rac-α-tocopherol acetate, all-rac-α-tocopherol, RRR-α-tocopherol acetate, RRR-α-tocopherol and combinations thereof. The physical form of the vitamin E in the milk product is selected from the group consisting of water-dispersible and oil-dispersible preparations.

In preferred embodiments, the portion of the product throughout which the vitamin E is uniformly microdispersed, is selected from the group consisting of the fat portion, the fat-free milk portion, and combinations thereof.

In preferred embodiments, the milk product includes a milkfat-containing cream portion and an oil-dispersible preparation of vitamin E which is microdispersed throughout the cream portion and throughout the product. Alternatively, the milk product is a filled milk product which includes a polyunsaturated, and/or monounsaturated vegetable oil-containing cream portion which may also include milkfat, and an oil-dispersible preparation of vitamin E which is microdispersed throughout the cream portion and throughout the product. Alternatively, the milk product is fat-free, and includes a water-dispersible preparation of vitamin E which is microdispersed throughout the product.

In another embodiment, ingestion of at least 100 IU of vitamin E per day (e.g., 1 to 2 servings) in said product for at least 4 weeks causes the fasting plasma vitamin E/cholesterol ratio to be at least doubled over the basal fasting plasma vitamin E/cholesterol ratio measured in the same subjects consuming no vitamin E dietary supplements. For example, the basal plasma ratio is between 5 and 6 micromoles of vitamin E per millimole of cholesterol, and the elevated plasma ratio is at least between 9 and 10 micromoles of vitamin E per millimole of cholesterol.

As described above, microdispersal of at least 50 IU vitamin E per serving in a milk product advantageously provides at least 100 IU in 1 to 2 servings. Recognition in the present invention that milk is a particularly effective delivery vehicle for vitamin E suggests that a level of vitamin E elevated above 30 IU per serving of milk is helpful, as it allows a quantity of vitamin E sufficient to provide substantial health benefits to be provided in fewer servings of a milk product than with previous milk products. Thus, in a related aspect, the invention features a milk product which includes at least 31 IU of vitamin E per serving of the product and preferably at least 40 IU per serving (or 50, 60, 80, 100, 200, 400 IU per serving). The vitamin E is microdispersed throughout the milk product. Daily ingestion of at least 50 up to 400 IU daily of the milk product causes the fasting vitamin E/cholesterol ratio to be elevated over the basal fasting vitamin E/cholesterol ratio to at least a two-fold greater extent than that elevation achieved by daily ingestion of the same quantity and chemical species of vitamin E provided in the form of a pharmacological capsule or pill. By contrast, with lower levels of vitamin E ingestion, such as 30 IU per day, only small, if any, differences exist between the absorption from capsules compared to absorption from milk.

With reference to the basal fasting vitamin E/cholesterol ratio, the term "double" or "doubling" means that the ratio has increased at least 80%.

In still another aspect, the invention features a method for elevating the fasting plasma vitamin E/cholesterol ratio at least 50% more preferably at least 60%, most preferably at least 80%, or more, in human subjects. The method includes the steps of providing a milk product with at least 50 IU of microdispersed vitamin E per serving, or preferably at least 60, 80, 100 or more (e.g., 200, 300, 400 or 600 IU per serving) (these levels are also applicable to aspects described below) of the product. The product can provide at least 100 IU of vitamin E per day to an individual ingesting between 1 and 2 servings of the product (depending on the actual vitamin E concentration in the milk product). At least 100 IU of vitamin E in the milk product is ingested daily for at least 2 weeks to cause the plasma vitamin E/cholesterol ratio to be elevated at least 50% preferably at least 60% and more preferably, at least 80% above the basal fasting vitamin E/cholesterol ratio measured in the same subjects consuming no vitamin E dietary supplements.

In yet another aspect, this invention features a method for reducing the incidence of non-fatal heart attacks by at least 50% in subjects having normal vitamin E uptake, and/or in subjects having coronary atherosclerosis. The method includes providing a milk product which includes at least 50 IU (preferably at least 60, 80, 100 or more IU) of vitamin E per serving of the product. The product provides at least 100 IU of vitamin E per day to an individual ingesting between 1 and 2 servings of the product (depending on the actual concentration). The vitamin E is uniformly microdispersed throughout the product. At least 100 IU of vitamin E in the product is ingested per day for at least 2 weeks to cause the fasting plasma vitamin E/cholesterol ratio to be elevated at least 50%, preferably at least 60%, 80% or more above the basal fasting vitamin E/cholesterol ratio measured in the same subjects consuming no vitamin E dietary supplements. This regimen is continued for at least 200 days and preferably indefinitely beyond. After these first 200 days, the reduced incidence of non-fatal heart attacks becomes apparent.

In reference to ingestion of a milk product, the phrase "ingested per day", or similar indications of daily practice, means nearly every day during a period or interval, but also includes each and every day. This can, for example, include every day, missing one day in a month, missing one day in each 2 weeks, or missing one day in each week, or missing days irregularly which average intervals as indicated. For obtaining the health benefits, the blood or plasma level should be maintained at an elevated level of at least 80% of the days in an interval, preferably, at least 90%, more preferably at least 95%, and most preferably at least 98% or even 100% of the days. The elevated level is at least 50%, preferably 60%, more preferably 80% over the basal fasting level.

For any aspect of this invention which specifies daily ingestion, in related aspects, the requirement of daily ingestion is replaced with the limitation that the plasma vitamin E/cholesterol ratio is increased at least 60%, preferably at least 70%, more preferably at least 80%, and most preferably at least 90% over the basal fasting ratio for individuals not previously consuming any vitamin E supplements. Thus, in these aspects, the ingestion can deviate from strictly daily so long as the ingestion is sufficiently consistent to maintain the plasma vitamin E/cholesterol ratio elevation at the specified level. To some extent, such maintenance can be accomplished by ingestion of even higher levels of vitamin E, even though on a less than daily frequency.

In preferred embodiments of the various aspects of this invention, the milk product; vitamin E; levels of vitamin E in the milk product; and/or plasma levels of vitamin E are as described above, including, in particular embodiments described for the first aspect.

In still another aspect, the invention features a method for beneficially fortifying a milk product with a defined quantity and chemical form of vitamin E. The milk product includes at least 31 IU of microdispersed vitamin E, preferably at least 40 or 50 IU, more preferably at least 60, 80, 100, 200, 400, or more IU per serving of the product. Daily ingestion of an amount of the milk product containing at least 100 IU causes an increase in the fasting plasma vitamin E/cholesterol ratio which is at least two-fold greater than that increase caused by daily ingestion of the same defined quantity and chemical form of vitamin E provided in the form of a pharmacological capsule or pill in the forms currently prepared. The method includes microdispersing the defined quantity and chemical form of vitamin E throughout the milk product.

In preferred embodiments of methods for fortifying a milk product and other aspects described herein, the chemical form of the vitamin E in the milk product is selected from the group consisting of all-rac-$\alpha$-tocopherol acetate, all-rac-$\alpha$-tocopherol, RRR-$\alpha$-tocopherol acetate, and RRR-$\alpha$-tocopherol. The milk product is preferably selected from the group consisting of regular milkfat-containing milk; fat-free skim milk, polyunsaturated fat-containing filled milk, and combinations thereof. Preferably the fat components of the milk product together provide a balanced fat.

For the purposes of this invention, the following terms have the following meanings in context.

The term "milk product" includes milk and/or cream-based products in whatever form, including, for example, liquid milks [including fat-free skim milk, whole milk, low-fat milk, reduced fat milk, butter milk, lactose-reduced milk and filled milks in which the milkfat portion of the milk is partially or completely replaced by a monounsaturated vegetable oil (e.g., canola oil) or a polyunsaturated vegetable oil (e.g., soybean oil)], as well as yoghurts, creams, sour cream, ice cream, cream cheese, cottage cheese, hard and soft cheeses, processed cheese, e.g., American cheese, buttermilk, egg nog, powdered and reconstituted milk, concentrated milk, condensed milk, and milk-based infant formula.

The definitions of International Unit (IU) and its relationship to the "quantity" (mass, generally in milligrams) and "chemical form" (all-rac-synthetic versus RRR-natural forms of α-tocopherol and α-tocopherol acetate) are discussed above.

The term "serving" or "serving size" is defined by the Food and Drug Administration (FDA) for most varieties of prepared foods. For milk, for example, a single serving equals 8 ounces (1 cup or approximately 236 ml).

The term "microdispersed" or "microdispersing" with regard to fat-soluble vitamin E (tocopherol or tocopherol acetate) refers to a process for blending or dissolving the vitamin E into the cream (milkfat-containing) portion of regular milk, or into the vegetable oil (e.g., soybean oil) component or blended vegetable oil and milkfat component of filled milks, and then pasteurizing and homogenizing the milk to reduce the diameter of most (>90%) of the fat particles to less than 2 microns. Thus, microdispersal ultimately distributes vitamin E into the small, stable microscopic fat particles which are present in homogenized milk. In the case of skim milk and other fat-free foods, the vitamin E is generally added as a pre-mixed, water-dispersible blend. For example, Roche Vitamins, Inc. (Paramus, N.J.) and Watson Foods Co., Inc (West Haven, Conn.) produce all-rac-α-tocopherol acetate in cold water-dispersible powder forms containing approximately 50% by weight vitamin E and 50% by weight of an emulsifier/dispersant system. In the Roche product, the dispersant consists primarily of dextrin and gelatin in a 3:2 weight ratio, while in the Watson product (used in the present clinical study), the dispersant is modified food starch. These dispersant systems allow the vitamin E to remain stably suspended, in a fine colloidal dispersion, within skim milk. To assure microdispersal of vitamin E throughout skim milk, the milk was pasteurized and homogenized, using methods well known in the art, after the water-dispersible vitamin E had been added to the milk. It is unknown whether microdispersal of vitamin E in skim milk is aided by natural components of the skim milk including the milk proteins, casein and lactalbumin, for example. The term "microdispersal" with regard to vitamin E dispersal in a milk product, also has a functional definition. If the vitamin E has been sufficiently well mixed, blended, emulsified, homogenized, or otherwise dispersed into a milk product, it has been "microdispersed" if the bioavailability of a dose of vitamin E, when tested in humans is at least two times (e.g., 2–3 times) greater (i.e., the increase over basal fasting vitamin E/cholesterol ratio in the subject's plasma is 2–3 times greater) than that measured using the same dose of vitamin E ingested in the form of a soft gel capsule. As evidenced in the research reported in Dimitrov et al., Am. J. Clin. Nutr. 53:723–729, 1991, merely ingesting oil-dispersible vitamin E together with milk, and obtaining natural mixing (and perhaps partial emulsification) in the stomach and small intestine, is not sufficient for achieving the improved bioavailability of the vitamin E.

The term "fasting plasma level of vitamin E" means that concentration of vitamin E measured in the plasma or serum fraction of the blood following an overnight fast by the subject of at least 10 hours.

The term "basal fasting level of vitamin E" refers to that fasting plasma level of the vitamin measured in subjects who have ingested no vitamin E supplements and a normal diet (i.e., not unusually rich in vitamin E) for at least 4 weeks time. Similarly, reference to "not previously ingested vitamin E supplements" or a similar terms indicates that vitamin E supplements have not been consumed by the person for at least 4 weeks.

Similarly, the term "fasting plasma vitamin E/cholesterol ratio" refers to the blood plasma or serum concentration of vitamin E divided by the plasma total cholesterol concentration, measured in subjects following an overnight fast of at least 10 hours.

Also similarly, the term "basal fasting vitamin E/cholesterol ratio" refers to the same basal fasting measurements in which the basal fasting plasma or serum vitamin E concentration is divided by the plasma total cholesterol concentration measured under the same dietary conditions. With the milk or dairy products of the present invention, ingestion as described generally causes an increase in the fasting plasma level of vitamin E. However, utilization of the plasma vitamin E/cholesterol ratio to measure the effect of ingesting the present dairy products is advantageous as the cholesterol level provides a normalizing factor, thereby simplifying data interpretation as there is less interindividual and intraindividual fluctuation in the ratio than in the plasma vitamin E level. Also, the ratio is believed to be more representative of the biologically significant role of vitamin E than is the absolute plasma vitamin E.

The term "pharmaceutical supplement" or "pharmacological supplement" in connection with delivery or ingestion of vitamin E refers to a composition prepared for human consumption primarily to deliver the vitamin E or vitamin E in combination with other vitamins, and which therefore contains the vitamin E in concentrated form. Thus, the term include, for example, pills and capsules. The term refers to such preparations as currently formulated or functional equivalents when used in connection with comparison of the relative bioavailability or absorption of vitamin E ingested in pharmaceutical supplement form as compared to a different delivery mode. This recognizes the possibility that at some time in the future, a pharmaceutical supplement, perhaps containing emulsifiers and/or a vitamin E-binding factor or carrier, might be developed which provides significantly better bioavailability than current preparations, e.g., current gel capsule forms. However, the term excludes general food products.

The term "balanced fat" is defined hereinafter. Recent human clinical studies described in Sundram et al., U.S. Pat. No. 5,578,334 and Sundram et al., U.S. Pat. No. 5,843,497 have shown that an approximately equal balance of dietary polyunsaturated and saturated fatty acids (which can be provided by a combination of vegetable fats with or without animal fat such as milkfat) generally provides the best serum cholesterol profile in terms of reducing the LDL cholesterol level while sustaining or increasing HDL cholesterol to produce a favorable increase in the ratio of HDL to LDL cholesterol. Accordingly, a "balanced fat" is any fat, fat blend, chemically modified fat, and the like (of vegetable and/or animal origin), containing between 15% and 40% by weight polyunsaturated fatty acids and between 20% and 40% saturated fatty acids by weight. Preferably, the balanced fat contains less than 1% elaidic acid or other unnatural trans fatty acid.

The term "absorption", and the extent of such absorption, such as "hyper-absorption" (higher than normal or unexpectedly efficient absorption) is used in the context of the level of vitamin E measured in either the plasma, lipoproteins, and/or in various cellular tissues. It is intended to include both the primary process of vitamin E transport into the bloodstream from the gastrointestinal tract, and to any secondary event(s) subsequent to the primary uptake process, e.g., liver-associated events, which may lead to an elevation in the measured levels of vitamin E. Thus, the term "absorption" is not limited to the primary absorption process of vitamin E uptake into the bloodstream following vitamin E ingestion. As a hypothetical example, if vitamin E were rendered more persistent or stable in the bloodstream by having been ingested in milk, the resulting increase in the plasma level of vitamin E would also be referred to as "increased absorption."

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Additional features and embodiments will be apparent from the following Detailed Description of the preferred embodiments and from the claims.

BRIEF DESCRIPTION OF THE DRAWING

FIG. 1 is a graph showing the % increase in vitamin E/cholesterol ratio over basal fasting level as a function of vitamin E dose per day. Curve A shows the results for vitamin E microdispersed in milk at 30, 100, and 200 IU per day (from clinical studies 3, 1, and 2, respectively). Curve B shows the results for vitamin E ingested in capsules from the Princen et al. studies. The data point marked with an arrow shows a match between the Princen et al. data and Applicants' data from clinical study #1 for 100 IU capsules (Princen et al., 35%; Applicant, 37%).

DETAILED DESCRIPTION OF THE PREFERRED EMBODIMENTS

In the development of the present invention, Applicants tested aspects of their hypothesis, that certain fat-containing foods might prove to be better vehicles than the traditional vitamin E capsule or pill, for delivering vitamin E to the bloodstream, based upon their abilities to elevate the plasma level of vitamin E and the vitamin E/cholesterol ratio. For example, it was of interest to determine whether a milk containing balanced fats (described above) in place of milkfat alone, could serve as an effective delivery vehicle for vitamin E.

In the haste to bring vitamin E-supplemented foods to market, little attention has been paid to the ingredients in foods, and their role in positively or negatively affecting vitamin E uptake into the plasma and tissues of the human body. A substantial published literature indicates that vitamin E, as a fat-soluble vitamin, is poorly absorbed into the bloodstream in the absence of dietary fat and/or fatty acids in the gastrointestinal tract. A review on the absorption of vitamin E appears in the book entitled *Vitamin E: A Comprehensive Treatise* [see Part 5A "Absorption", by H. Gallo-Torres (L. Machlin, editor; published by M. Dekker, Inc. 1980]. Within Part 5A of this review, research relating to the efficiency of absorption of vitamin E is discussed. The following conclusions were made: As much as 80–90% of supplemented $\alpha$-tocopherol may be excreted in the feces. Bile salts from the liver, and pancreatic juice appear to be essential for in vivo hydrolysis of the vitamin E ester ($\alpha$-tocopherol acetate) in the gut lumen, and for its absorption. Absorption of $\alpha$-tocopherol occurs via the lymphatic pathways where it is transported as part of a lipoprotein complex. The intestinal fatty acid and glyceride microenvironment affects vitamin E absorption, with polyunsaturated fatty acids generally diminishing vitamin uptake, and monounsaturated-containing triglycerides generally increasing uptake. The lipid-bile micelle is required to transport the relatively hydrophobic vitamin E across the aqueous layer along the brush border of the intestinal microvilli. Vitamin E appears to be co-absorbed with free fatty acids and monoglycerides. In summary, Gallo-Torres makes several statements including: "The absorption of tocopherol is intimately related to the simultaneous digestion and absorption of dietary lipids [however] the intimate mechanism of tocopherol absorption is poorly understood."

The term "bioavailability" was first introduced by Oser et al. in an article entitled "Study of methods for determining availability of vitamins in pharmaceutical products" (Ind. Eng. Chem. 17, 405–411,1945). Vitamin bioavailability refers to both the rate and time-integrated extent of absorption of a vitamin dose reaching circulation. In a research article by Acuff et al. (Am. J. Clin. Nutr. 60: 397–402, 1994), it was shown that over a ten day interval with humans simultaneously consuming both 150 mg of natural and 150 mg of synthetic vitamin E daily in a soft gelatin capsule, the competitive bioavailability of the natural isomer form of vitamin E (RRR-$\alpha$-tocopherol acetate) in the plasma was up to two-fold greater than the synthetic form (all-rac-$\alpha$-tocopherol acetate, used in most commercial vitamin supplements). However, simultaneous ingestion and competition between natural and synthetic vitamin E in the plasma in the Acuff et al. study does not predict the absolute bioavailability of each form of the vitamin, which could be determined by separately ingesting each form of vitamin E and comparing the resulting plasma levels of the vitamin (see, Clinical Study #2 below)

In relation to the absorption of vitamin E, a portion of the introduction to a recent research article by Mitchell et al., entitled "Bioavailability for rats of vitamin E from Fortified Breakfast Cereals" (J. Food Sci., 61, 1257–1260, 1996), is quoted (minus secondary literature citations) as follows:

> Vegetable oils, cold-pressed seed oils, products from such oils, wheat germ, and nuts are among the best food sources of vitamin E. Processed breakfast cereals are frequently fortified with vitamin E to assure good sources of this nutrient. The bioavailability of dietary vitamin E is affected by differences among ingested forms, processing methods, physiologic factors (e.g., nutritional status), drugs and other dietary components. Dietary fat affects vitamin E utilization. Simultaneous digestion and absorption of fat enhance the efficiency of vitamin E absorption, whereas certain types of dietary fat containing polyunsaturated fatty acids (PUFAs) decrease vitamin E absorption and utilization. Kahlon et al. reported that coarse wheat bran reduced liver storage and plasma levels of $\alpha$-tocopherol when compared with such levels in rats fed fine wheat bran or cellulose. Schaus et al. reported that pectin reduced the bioavailability of vitamin E. Other dietary constituents such as vitamin A and carotenoids may interract with vitamin E in animals. In general, information is lacking on vitamin E bioavailability from vitamin E-containing or fortified foods.

In this rat study by Mitchell et al., the effect of a food vehicle on the bioavailability of vitamin E was tested. The bioavailability of the ester form of natural vitamin E (RRR-$\alpha$-tocopherol acetate) incorporated into a commercially fortified breakfast cereal was comparable to the bioavailability of the same vitamin added separately to the rat's control diet. Thus, breakfast cereals did not prove to be a vehicle which enhanced vitamin E absorption. Bioavailability was determined by measurements of tocopherol concentrations in blood plasma, red blood cells, heart, liver and adipose tissues.

In conducting a literature review for the present invention, Applicants could not find a single research study or patent citation in which the bioavailability (or even the plasma level) of vitamin E derived from a food product, has been experimentally compared with the bioavailability of the same amount and form of vitamin E provided in capsules or pills. Nor could Applicants find a single article investigating the plasma level or bioavailability of vitamin E resulting from vitamin E supplementation of a milk, or any other dairy product.

In one rare controlled study of vitamin E absorption from a food, KH van het Hof et al. (Eur. J. Clin. Nutr. 52, 292–299, 1998) measured the levels of various antioxidants in the plasma of fifteen people after they had consumed one 15 g dose per day (for four weeks) of a full fat margarine containing a variety of antioxidants including 31 mg of $\alpha$-tocopherol. A control group of sixteen people consuming the same margarine without antioxidants showed only a 3% increase in the fasting plasma level of vitamin E, while the supplemented group showed a 19% increase. KH van het Hof et al. found that the net increase of 16% in the plasma vitamin E level over the control was significant. With regard to efficacy of absorption, this 16% increase is similar to the percentage increases (19%) reported elsewhere for people ingesting 25–30 mg of all-rac-$\alpha$-tocopherol acetate per day in capsule form (e.g., Princen et al., Arterioscler. Thromb. Vasc. Biol., 15: 325–333, 1995).

Therefore, from the above studies of Mitchell et al., and KH van het Hof et al., evidence is lacking that blending and physical dispersal of vitamin E throughout any food (either a relatively low fat food such as breakfast cereal or a high fat food such as margarine), can enhance vitamin E absorption into the bloodstream, relative to ingesting vitamin E in capsule form.

The above-cited report by Princen et al. also presents a precise series of measurements on increasing fasting plasma levels of vitamin E in a fixed group of 20 human subjects (10 males, 10 females, aged 21–31 years) who, during 2 week intervals, consecutively ingest progressively larger doses of vitamin E (all-rac-$\alpha$-tocopherol acetate) in capsules. The overall group (n=20), commencing without any supplement, had an average plasma vitamin E level of 24 $\mu$mol per liter (1015 $\mu$g per deciliter). Daily capsule doses, average plasma vitamin E concentration levels and average cholesterol values for the group are included below. These values allow calculation of the increases in fasting plasma levels of vitamin E (% above the basal fasting level), and increases in fasting plasma vitamin E/cholesterol ratios (% above the basal fasting ratio). The calculated percentage increases versus capsule doses are consistent with measurements derived from many other clinical studies, and will be used herein in comparing the relative efficacy of capsule deliver with alternative vehicles, such as milk, as described in the present invention.

| Data of Princen et al., for Vitamin E Capsules | | | | | | | |
|---|---|---|---|---|---|---|---|
| Daily Dose (IU vit. E acetate): | 0 | 25 | 50 | 100 | 200 | 400 | 800 |
| Plasma Vit. E ($\mu$mol/L) | 23.6 | 28.1 | 28.7 | 32.5 | 39.3 | 51.7 | 61.2 |
| Plasma Vit. E ($\mu$g/dL) | 1017 | 1211 | 1237 | 1401 | 1694 | 2228 | 2638 |
| Plasma Vit E Increase (%): | — | 19 | 22 | 38 | 67 | 119 | 159 |
| Plasma Cholesterol ($\mu$mol/L) | 4.36 | 4.55 | 4.36 | 4.45 | 4.40 | 4.44 | 4.35 |
| Vit. E/Chol. ($\mu$mol/mmol) | 5.41 | 6.17 | 6.58 | 7.30 | 8.93 | 11.64 | 14.07 |
| Vit. E/Chol. (ratio Incr. (%)) | — | 14 | 22 | 35 | 65 | 115 | 160 |

The role of fat in vitamin E absorption was studied in humans taking one daily capsule containing 880 mg all-rac-$\alpha$-tocopherol by Dimitrov et al. (Am. J. Clin. Nutr. 53, 723–729, 1991). These investigators showed that the plasma vitamin E concentration in subjects consuming the vitamin supplement along with a high-fat diet (containing an uncontrolled fat composition providing 43% of calories) was significantly higher than that in the same people fed a low-fat diet (cross-over design, with fat providing 25% of calories). In light of the milk-related discoveries of Applicants in the present invention, it is interesting that all of the subjects in the study by Dimitrov et al. were given vitamin E capsules along with either 5 ounces of whole milk (high-fat diet) or 5 ounces of skim milk (low-fat diet). However, given the very high capsule dose of vitamin E (880 mg) described by Dimitrov et al., and the very small resultant increase in plasma vitamin E level for the low-fat diet (approximately 7 mmol/liter of plasma), it is apparent that the enhanced absorption of vitamin E described in the present invention was not obtained by Dimitrov et al. That is to say, from Applicant's results discussed below, it is apparent that vitamin E should be microdispersed within a milk product before it is ingested, if the benefits of the present invention are to be obtained.

Fats having high contents of polyunsaturated fatty acids tend to substantially reduce vitamin E uptake. For example, Meydani et al. (Lipids, 22, 345–350, 1987) showed that mice fed vitamin E in fish oil which contains approximately 30% by weight of highly polyunsaturated fatty acids (having five and six carbon-carbon double bonds per molecule) such as eicosapentaenoic acid, exhibited substantially lower plasma and tissue levels of vitamin E than mice fed vitamin E in corn oil (containing 58% by weight linoleic acid, the most prevalent polyunsaturated fatty acid, having only two double bonds per molecule). Furthermore, corn oil was a poorer vehicle for delivering a given dose of vitamin E than coconut oil (a saturated fat). Therefore, the degree of unsaturation as well as the amount of polyunsaturated fatty acids in the diet affect the plasma level of vitamin E. In essence, such reports suggest that vitamin E-supplemented food products that either lack fat or which contain almost exclusively polyunsaturated fatty acids, might fail to deliver vitamin E efficiently to the plasma and to other tissues.

Other food products supplemented with vitamin E (as well as other vitamins), contain partially hydrogenated vegetable oil as their fat component. For example, Arcadipane in U.S. Pat. No. 5,393,551 describes a modified milk composition containing partially hydrogenated soybean oil in place of milkfat, and vitamins A, D and E (approximately 8 IU per 8 ounce serving). However, partially hydrogenated vegetable oil as a vehicle for vitamin E delivery is not recommended because it contains trans-elaidic acid, which now has been shown to contribute to CHD in humans, and increase the level of LDL cholesterol, which vitamin E is supposed to target to elicit its beneficial effect (Katan et al., Eur. J. Clin. Invest. 28: 257–258, 1998; Jialal et al., Arterioscler. Thromb. Vasc. Biol., 15, 190–198, 1995).

Regarding the addition of vitamin E to foods, this vitamin has been generally been added as an antioxidant to prolong shelf-life, rather than as a dietary supplement, owing to the general knowledge that vitamin E is unstable in foods over time (see, e.g., "Eastman Tenox™ GT-1 and TenoX™ GT-2: Food Grade Anti-oxidants Natural Mixed Tocopherols", Publ. # ZG-263-B, Eastman Chemical Co., Kingsport, Tenn.). Indeed, its susceptibility to oxidation allows vitamin E to be sacrificed in a food product to keep other constituents from being oxidized and developing off-flavors. Due to this oxidative susceptibility, high levels of supplemental vitamin E have traditionally been packaged in protective capsules or pills, rather than is foods. However, in the present invention, with the surprising discovery that the bioavailability of vitamin E microdispersed in milk is very high, and with the gain in bioavailability (compared to vitamin E capsules) greatly exceeding the observed processing and shelf-life losses in vitamin E level occurring in a milk product, it now becomes advantageous and cost-effective to fortify milk products with relatively high levels of this vitamin. For example, as described herein, regular daily ingestion of 100 IU of vitamin E microdispersed in milk provides a boost in the basal fasting plasma vitamin E/cholesterol ratio comparable to that boost achieved with regular daily ingestion of as much as 400 IU in the form of a soft gel capsule (i.e. approximately a doubling of the ratio), while the processing and storage loss for the milk product is typically about 25–35%.

It is unknown whether milkfat, as a saturated fat, promotes or inhibits intestinal absorption of vitamin E. However, it may be noted that any substantial increase in saturated fat intake can undesirably raise the level of LDL cholesterol in the bloodstream, thereby increasing the amount of vitamin E needed to protect that increased level of LDL against oxidation. On the other hand polyunsaturated fats lower LDL cholesterol, but are known to reduce the uptake of vitamin E in mammals. Thus, the potential paradox of fat composition, LDL level, and vitamin E delivery is apparent.

Despite the variety of commercial food products which have been fortified with vitamin E, it is apparent that there is no consensus on what foods or food ingredients are the most suitable vehicles for vitamin E, in terms the chemical stability and absorption of the vitamin into the bloodstream. Land O'Lakes Corporation (Minneapolis, Minn.), for example, introduced vitamin E into orange juice and milk (Plus 3™ Lactobacillus acidophilus and Bifidobacteria culture-inoculated milk and orange juice, both products stated to contain 100% of the Daily Value (understood to mean 1 RDA, which is 30 IU) of all-rac-α-tocopherol acetate per 8 ounce serving). No information is available on whether the vitamin E is microdispersed within these products, and whether tocopherol absorption into the human bloodstream, i.e., vitamin bioavailability, has been tested with either the milk or the orange juice.

Obtaining many of the benefits described in the present invention requires that an individual ingest at least between 100 IU to 200 IU of vitamin E microdispersed in a milk product each day. If Land O'Lakes Plus 3™ milk in fact contains vitamin E which has been microdispersed therein, given that their milk provides no more than 30 IU of vitamin E per serving, between 3.5 and 7 servings of this specialty milk product would be required each day to reach a level of 100–200 IU of vitamin E. Requiring this amount of Plus 3™ milk to be ingested each day to achieve the benefits of the present invention is considered impractical (and expensive) from the viewpoint of consumer compliance.

In addition, as Applicant has described, normal processing of milk and other food products commonly includes heating, e.g., pasteurization. Applicant has determined that the loss of vitamin E associated with such processing is typically 10–30%, generally about 20–25%.

Furthermore, shelf-life loss of vitamin E over 2–3 weeks in refrigerated milk is generally about 15% (see Table 3 below). Such combined vitamin losses are substantial, e.g., 35%, as must be known to those skilled in the art.

Such losses render the fortification of most food products at high levels of vitamin E impractical and uneconomical. For example, the currently most popular and medically recommended daily dosage of vitamin E is 400 IU of all rac-α-tocopherol acetate in a capsule. If an equal amount of vitamin E were to be included in two servings of milk, and vitamin E sustains a typical processing and shelf-life loss of about 35%, then an initial excess of approximately 100 IU vitamin E per serving (bringing the initial level to 300 IU per serving) would be required, so that the final level after losses would be 200 IU per serving. At current bulk pricing of vitamin E, this loss would be about $0.004 per serving or 1.6¢ per quart of milk. Such a loss would be commercially unacceptable. It is believed that, at least in part for this reason, high doses of vitamin E, e.g., 200 IU per serving, are not currently added to milk or other processed foods. Instead, such high doses of vitamin E are ingested in a capsule or other stable pharmaceutical form in which there is negligible vitamin loss.

However, the present invention demonstrates that reduced doses (as compared to the doses required if the ingestion of vitamin E is from capsules) of vitamin E microdispersed and ingested in milk (e.g., 50 IU per serving, two servings per day) can provide the benefits of a much higher vitamin E dose (e.g., 400 IU) ingested daily in a capsule or equivalent means. Taking advantage of this discovery, by supplementing milk at a level of only 50 IU per serving, the cost of compensating for a 35% processing and shelf-life loss is only 0.4¢ per quart. Therefore, by means of the discovery that reduced levels of vitamin E in milk (having economically acceptable processing and shelf-life vitamin losses) can provide the health benefits otherwise achieved with high level vitamin E pharmaceutical supplements such as 400 IU capsules, vitamin E supplementation of milk at levels sufficient to provide substantial health benefits is practical and beneficial. However, these so-called reduced levels of vitamin E in the present invention are higher, and preferably substantially higher, than the present RDA level of vitamin E (30 IU per serving) which has been stated to have been included in at least one milk, an orange juice and a margarine. In fact, at a dosage level of only 30 IU per day, there is little if any advantage of consuming this dose microdispersed in milk as compared to consuming the same dose contained in a capsule (see FIG. 1 and explanation below).

As indicated above, the 2–3-fold bioavailability increase which results from providing vitamin E microdispersed in milk at a daily ingestion level of about 100 IU per day (as compared to capsules or other vehicles such as orange juice), is far greater than the decrease or loss of vitamin E, e.g. 35%, which results from processing and refrigerated storage of the milk. Thus, milk provides an adequate storage medium, and a particularly advantageous delivery medium for vitamin E. Taking these opposing factors together, there is strong justification for vitamin E fortification of milk and other dairy products at increased levels, i.e., exceeding 30 IU per serving, as described in this invention.

While it is recognized that some milk is marketed without a pasteurization process, all liquid, i.e., fluid, milk products specifically described herein have been pasteurized under either standard or ultra-high temperature (UHT) conditions, or have been otherwise treated to substantially or completely eliminate viable microorganisms in these products to assure a long shelf-life under a variety of storage conditions. However, some products may have particular microorganisms added back to the product. For example, Applicants have tested a fluid milk which has been inoculated with live cultures of *Lactobacillus acidophilus* and Bifidobacteria and commercially marketed as a specialty milk. This milk (Land O'Lakes Plus 3™) must be maintained under strict refrigeration to prevent its spontaneous fermentation into a yogurt-like product during overnight incubation (e.g., at room temperature). While not essential, in preferred embodiments the milk products of the present invention do not contain live culture microorganisms beyond the low level of microorganisms which may remain following pasteurization or other equivalent microorganism-reducing process.

The public awareness of an increased risk of cardiovascular disease associated with dietary consumption of an excessive proportion of saturated fats and cholesterol has led to an overall reduction in animal fat consumption (including milkfat), and an increased demand for foods containing monounsaturated and polyunsaturated fats to balance the intake of saturated fats. Many clinical studies have shown that replacing a significant proportion of dietary saturated fat with unsaturated fat will lower total serum cholesterol. Since the milkfat (i.e., butter) in dairy products contains more than 60% saturated fatty acids and only approximately 4% polyunsaturated fatty acids, plus approximately 0.22%–0.25% by weight cholesterol, health-conscious individuals and public health advocates would prefer to consume dairy products in which the milkfat content has been reduced, eliminated, or replaced with vegetable oil.

Accordingly, Applicants investigated the possibility of replacing between one-third and two-thirds of the milkfat in dairy products with a polyunsaturated vegetable oil such as soybean oil, rich in n–3 and n–6 essential fatty acids (linolenic and linoleic acids). However, Applicants also wished to fortify these dairy products with vitamin E, and were aware from the literature (see above) that polyunsaturated fats might significantly and undesirably reduce the absorption of vitamin E into the bloodstream. Thus, dairy products rich in milkfat could prove to be a better means of delivering vitamin E to tissues than an equal amount of soybean oil. At the same time, however, polyunsaturated fats would have the advantage of lowering plasma total cholesterol. An extension of this application would be to achieve the necessary balance between saturated and polyunsaturated fats, to obtain the major benefits from each fat (including the benefits of saturates to increase α-tocopherol deposition in tissues and raise HDL cholesterol as discussed above).

Before modifying the fat composition of dairy products for human consumption, a sensitive animal model test system (the gerbil) was used to test the above hypotheses relating to the effects of altering the dietary proportion of saturated fat (milkfat) and polyunsaturated fat (soybean oil). In addition to monitoring the plasma levels of vitamin E, cholesterol, triglycerides and retinol, the lipoprotein fraction was examined in detail. Levels of vitamin E accumulating in the liver and adipose tissues were also monitored.

Male weanling gerbils were used to test whether a fat blend containing approximately equal proportions of saturated and polyunsaturated fatty acids would be useful for transport (absorption into plasma) and accumulation of vitamin E in tissues (liver, adipose). At the same time, the lipoprotein profile would indicate whether the fat blend would produce an advantageous decline in total cholesterol while maintaining better vitamin E delivery than a polyunsaturated vegetable oil. Three groups of male gerbils (n=8 per group) were fed standard purified diets containing 30% calories from fat (Pronczuk et al., FASEB J., Vol. 8, 1191–1200, 1994). All gerbil diets contained oil-dispersible all-rac-α-tocopherol acetate (Roche Vitamins Inc., 100 mg/kg of diet). The dietary fat differences among the groups were as follows: Group 1: 100% regular milkfat; Group 2: 45% milkfat+45% soybean oil+10% mono- and diglyceride emulsifiers; Group 3—100% soybean oil. Gerbils were fed 8 g of diet per day and weighed weekly. Terminal blood, liver, and adipose (right perirenal fat pad) were collected, weighed, and assayed for α-tocopherol and cholesterol concentrations. Plasma cholesterol, triglycerides, retinol, and lipoproteins were assayed and the α-tocopherol:plasma cholesterol ratio determined (see Table 1).

TABLE 1

Effect of dietary fat composition on plasma, liver and adipose tissue lipids, and on vitamin E status in gerbils fed diets containing either milkfat, soybean oil or blends thereof, with supplemental vitamin E (100 mg/kg of diet)

| | DIETS | | |
|---|---|---|---|
| | I<br>Milkfat | II<br>45% Milkfat/<br>45%<br>Soybean oil | III<br>Soybean<br>oil + 10%<br>mono &<br>diglycerides |
| A. Body weight | | | |
| Initial (g) | 57 ± 2 | 57 ± 2 | 57 ± 2 |
| 4 wks (g) | 63 ± 5 | 63 ± 3 | 60 ± 3 |
| B. Plasma | | | |
| total cholesterol (mg/dL) | 175 ± 32[a,b] | 111 ± 21[a,c] | 76 ± 19[a,c] |
| triglycerides (mg/dL) | 106 ± 38 | 86 ± 33 | 63 ± 34[a] |
| retinol (μg/dL) | 33 ± 7 | 35 ± 6 | 30 ± 9 |
| α-tocopherol (μg/dL) | 2636 ± 550[a] | 1799 ± 521[a,c] | 998 ± 428[b,c] |
| (μmol/L) | 61 ± 13 | 42 ± 12 | 23 ± 10 |
| α-toc./chol. (molar ratio) | 1:74 ± 4[a] | 1:70 ± 8[b] | 1:90 ± 19[a,b] |
| (prior gerbil study) | 1:74 ± 9 | 1:69 ± 7 | (NA) |
| Lipoprotein fraction* | | | |
| VLDL-C (mg/dL) | 32 ± 1[a,b] | 14 ± 0[a] | 10 ± 1[b] |
| LDL-C (mg/dL) | 45 ± 6[a,b] | 26 ± 1[a] | 15 ± 3[b] |
| HDL-C (mg/dL) | 99 ± 15[a] | 72 ± 6 | 51 ± 3[a] |
| LDL-C/HDL-C (ratio) | 0.46 ± 0.01[a] | 0.36 ± 0.04 | 0.30 ± 0.04[a] |
| C. Liver | | | |
| α-tocopherol (μg/g) | 72 ± 19[a] | 50 ± 8 | 28 ± 7[a] |
| total cholesterol (mg/g) | 14.5 ± 4.2[a] | 9.0 ± 2.1 | 5.3 ± 1.5[a] |
| α-toc./chol. (molar ratio) | 1:228 ± 58 | 1:198 ± 42 | 1:207 ± 13 |
| D. Adipose | | | |
| α-tocopherol (μg/g) | 7.5 ± 1.6 | 4.4 ± 2.2 | 4.6 ± 1.8 |

Values are mean ± SD (n = 8; liver and adipose n = 4).

*VLDL, LDL and HDL obtained by discontinuous gradient ultracentrifugation (n = 2, 4 pooled plasmas each).
[a]Means in rows sharing a common superscript are significantly different (p < 0.05) by repeated-measures ANOVA and Scheffe's F-test.

There is little ambiguity in the results which are presented in Table 1. These results indicate the following: Body weight was unaffected by the difference in dietary fats. Total plasma cholesterol, triglycerides and lipoproteins all decreased as the proportion of polyunsaturated fat (soybean oil) increased. Cholesterol within the lipoprotein fractions decreased as the soybean oil content was increased, steadily improving the LDL/HDL ratio. Plasma retinol concentration remained approximately constant. The vitamin E in the plasma and liver dramatically decreased as the proportion of polyunsaturates increased. Thus, when the dietary fat was 100% soybean oil, plasma vitamin E was only 38% of the level observed with 100% milkfat. However, 100% soybean oil also decreased plasma cholesterol about 2.3-fold. As a result of these concurrent changes, the molar ratio of vitamin E to cholesterol in plasma (an important indicator of vitamin E protection of cholesterol against harmful oxidation) remained relatively constant. In fact, the most favorable vitamin E:cholesterol ratio was measured in gerbils fed the soybean oil-milkfat blend (Group 2). Additional data was obtained in an earlier study using two other gerbil groups (see Table 1 data marked "prior gerbil study"). These data which were also obtained using 8 animals per group (treated identically to groups 1 and 2), confirm the reproducibility of the observations.

These gerbil data suggest that vitamin E in a controlled diet containing an approximately equal proportion of polyunsaturated and saturated fats may allow the ratio of vitamin E to cholesterol in the plasma to be maximized. Indeed, the immediate food and chemical environment in which the vitamin is carried through the small intestine may be controlling the amount of the vitamin which is absorbed. These gerbil data are also consistent with the prior art literature discussed above, i.e., that ingesting vitamin E in the presence of saturated fat, e.g., vitamin E dispersed in milkfat or coconut oil maximizes the absolute level of absorption.

With the gerbil results and the prior art literature as evidence for saturated fat promoting vitamin E absorption, Applicants investigated dairy products, e.g., milk with its saturated milkfat as a potentially ideal delivery vehicle for vitamin E supplementation of humans. It was anticipated that the relative content of milkfat (as the saturated fat in milk and other dairy product such as yoghurt, ice cream, cheese) would be critical in determining how efficiently vitamin E was absorbed into the bloodstream. Milk and orange juice have been used previously (Land O'Lakes, Inc., Fluid Dairy Division, St. Paul, Minn.) to provide up to 30 IU vitamin E per 8 ounce serving of beverage. However, there is no information available on whether vitamin E can be absorbed by humans from cow's milk fortified with vitamin E. Even if some absorption into the human bloodstream were assumed, the prior art literature on vitamin E absorption from supplemented food (margarine and cereal studies discussed above) suggest that supplemental vitamin E is absorbed just as well (or better) from capsules.

Before describing the human clinical study on vitamin E absorption from milk, the following description is provided to define several terms used in conjunction with milk. The term "milk" is meant to include various product categories based upon their weight percentage fat contents, including whole milk, reduced and low milkfat milks, skim milk (fat free), as well as filled milks (at least some of the milkfat replaced by vegetable oil). Regular whole milk contains approximately 3.25%–4.0% milkfat. Based upon an 8 fluid ounce (244 g) serving size, this corresponds to 7.9–8 grams (abbreviated g) milkfat and 35 milligrams (abbreviated mg) cholesterol per serving A "reduced fat" product must contain no more than 75% of the fat present in the original product, while a "low fat" product must contain no more than 3 g fat per serving. Thus, for milk having a 244 g serving size, a 1% milkfat-containing milk is termed a low fat milk, while a 2% milkfat-containing milk is termed a reduced fat product. On the other hand, to meet the current definition of "skim", "non-fat", or "fat-free" milk (having a 245 g serving size), the milk must contain less than 0.2% by weight milkfat, i.e., less than 0.5 g per serving, and less than 5 mg cholesterol per serving. Filled milk, on the other hand, is defined as skim milk which has been enriched in fat content by addition of vegetable oil. The fat portion of filled milks may, in principle, include modified fats (such as interesterified fats), certain single species of natural fat, and fat blends. If such a fat contains between 15% and 40% by weight polyunsaturated fatty acids and between 20% and 40% by weight saturated fatty acids (the remainder being principally monounsaturated fatty acids), then for the purposes of the present invention, it is termed a "balanced fat" as described above.

HUMAN CLINICAL STUDY #1

Objective: This study was designed to determine whether the increase in the steady state plasma level of vitamin E and the ratio of vitamin E to cholesterol in the bloodstream is greater in people ingesting a specified supplemental dose of vitamin E packaged in the form of capsules, or alternatively, dispersed in any one of a variety of milks (e.g., milk containing 1% fat, including regular milkfat, soybean oil-filled milk, and a 50—50 soybean oil-milkfat blend), or alternatively fat-free skim milk. The study was also intended to test the expectation that bloodstream absorption of vitamin E, a fat-soluble vitamin, would be stimulated by ingesting the vitamin dispersed in a fat, particularly a saturated fat (milkfat), and diminished by ingesting the vitamin dispersed in a polyunsaturated fat (e.g., soybean oil). At the same time it was important to test whether the overall plasma lipoprotein profile of individuals remains constant as the polyunsaturated/saturated fat ratio in milk, or the vitamin E status changes, and whether the plasma level of another fat-soluble vitamin, vitamin A, is diminished in a competitive manner by an increase in added vitamin E.

Rationale: The importance of antioxidants in protecting mammalian systems against oxidative insults from our environment is well established. Alpha-tocopherol (vitamin E) is the primary fat-soluble antioxidant in vivo, protecting unsaturated lipid moieties in cell membranes and lipoproteins from peroxidative damage that results from the metabolic "wear-and-tear" of daily living.

Recent studies have clearly demonstrated the protection provided by vitamin E against atherosclerosis and coronary heart disease (CHD). The mechanisms of protection are thought to be multi-fold. On the one hand, tocopherol is known to protect LDL cholesterol from undesirable oxidation, with oxidized-LDL being highly atherogenic. In addition, tocopherol is known to depress formation of endoperoxide which accelerates platelet aggregation and thrombogenesis, the most devastating aspect of the atherogenic process. Epidemiologic studies have consistently shown that individuals who consume extra vitamin E (100–400 IU/day) reduce their relative risk of CHD by 50% or more.

Vitamin E also helps sustain a healthy immune response, and has been shown to protect against a decline in immune function commonly associated with aging. Loss in this function appears to contribute to the increased incidence of cancer in the aging individual. Accumulating evidence also suggests that vitamin E may delay the onset of mental deterioration in Alzheimer's Disease.

Given the many health benefits of vitamin E, it would be significant if a commonly consumed food source, i.e., a food staple, could be fortified with this vitamin. Such fortification would improve the economy and availability of the vitamin to the average consumer. However, such fortification would require that vitamin E be chemically stable in a particular fortified food, and that the vitamin E be efficiently absorbed into the bloodstream from that food. More specifically, the economy and efficiency of vitamin E absorption from such a fortified food should be compared with the economy and efficiency of absorption from a vitamin pill or capsule (the currently preferred mode of ingesting vitamin E). If, in fact, a vitamin E-fortified food staple could deliver the vitamin to the bloodstream more economically and efficiently than say a capsule, the food could provide a very substantial public health benefit. This benefit could be on a scale equal to or greater than that of vitamin D fortification for preventing rickets, vitamin A for night blindness, iodine for preventing goiter, and folic acid for neural tube defects.

Many animal model nutritional studies, including the gerbil experiment summarized in Table 1, have demonstrated the benefits of adding 50% by weight polyunsaturated fat (soybean oil) to a diet which is otherwise extremely rich in saturated fat (milkfat). The data show that addition of polyunsaturates (and removal of cholesterol) causes a lowering of total cholesterol (TC) and an improved LDL/HDL ratio. In this same experiment, the gerbil diets were fortified with vitamin E (all-rac-$\alpha$-tocopherol acetate). The influence of the different fats (which had been combined with the vitamin in the gerbil food) on the steady-state plasma levels of vitamin E in the gerbil are also evident in Table 1. The most obvious conclusion from this experiment is that plasma vitamin E levels were highest when the vitamin was consumed in the presence of saturated fat (milkfat), and lowest when the vitamin was consumed in a diet rich in polyunsaturates (soybean oil). The plasma level of vitamin E was intermediate when a 50—50 blend of milkfat and soybean oil was used as the dietary fat "carrier" for the vitamin. This result in Table 1 is entirely consistent with the body of published literature indicating that polyunsaturated fats (compared with saturated fats) reduce the absorption of vitamin E. This interpretation ignores the fact that polyunsaturates, by lowering the level of all lipoproteins which transport vitamin E, would therefore lower the plasma level of the vitamin, independent of the absorption factor. An examination of the important ratio of plasma vitamin E to cholesterol in the plasma (which corrects for any distortion introduced by both absorption and transport of vitamin E) can be used to gauge relative degrees of protection of LDL cholesterol by the vitamin against harmful oxidation (see Table 1). These ratios indicate that vitamin E may be just as effective for such protection when provided in a diet whose fat includes a blend of 50% soybean oil and 50% milkfat, as when provided in 100% milkfat, and that both are better than 100% soybean oil.

In approaching the human diet, the above gerbil experiment suggested that an ideal food for vitamin E fortification might be a food staple in which polyunsaturated and saturated fats could be combined in nearly equal proportions. For possible dairy products, Applicants considered filled milks in which a 50:50 soybean oil-milkfat blend could be substituted for regular milkfat. While previous research (Sundram et al., U.S. Pat. No. 5,578,334 and Sundram et al., U.S. Pat. No. 5,843,497) would predict that such milks could lower the TC level and improve the LDL/HDL cholesterol ratio, detecting an improved cholesterol response from this fat would typically require substitution and control of at least 60% of the total daily fat intake. In planning the present clinical study, ingesting two 8 ounce glasses of 1.0% milk would represent about 220 kcal and 5 gm fat, which represents only about 10% of the total daily calories and <10% of total daily fat, respectively. Therefore, obtaining data on cholesterol-lowering would ultimately require a clinical study that more fully controls dietary intake of fat and includes a number of fat-containing foods in addition to milk.

Design of Clinical Study on Vitamin E Absorption from Milk

Subjects: All subjects were normolipemic, non-smoking, non-medicated healthy males and females recruited from the Brandeis University community by advertisement. Individuals were prescreened by questionnaire to be free of any liver, kidney, intestinal or cardiovascular ailment, lactose intolerance and, if enrolled, would be willing to consume 16 oz. milk or one vitamin capsule daily for a period of 4 weeks. Any subjects with a history of vitamin or mineral supplementation were excluded. Body weight, height, and age were recorded at a face to face screening interview where details of the study were explained. All procedures were approved by the Institutional Review Board (IRB) at Brandeis University, and all of the participating subjects signed an approved consent form.

Groups: Prior to enrollment, a screening blood sample was drawn in order to assess plasma TC, LDL, HDL and TGs as well as α-tocopherol status. Cholesterol cut-off for entry into the study was set at <225 mg/dL, with α-tocopherol at <1250 mg/dL (29 µmol/L). Group assignment was random except for gender. Since more females volunteered than males, an attempt was made to place at least 3 males in each group of 8 subjects. Overall, 63 of approximately 100 phone inquires resulted in subjects who were screened face-to-face to identify the final 48 recruits (ages 18–40 yrs, mean age 21.5±1.8 yr) who were eventually enrolled in the study. Six groups of eight subjects per group were studied. With five of the groups, subjects consumed two 8 oz. glasses of milk per day, for a period of four weeks, while subjects in the sixth group (control) consumed one vitamin E capsule (100 IU all-rac-α-tocopherol acetate) per day before breakfast for a period of four weeks. Each of the five milk-consuming groups was assigned to one of the different milk formulations detailed below, maintaining the same daily consumption rate (two 8 ounce glasses of milk, one glass with breakfast, and one with dinner). With the exception of skim milk, the milk formulations contained 1% by weight fat. Three controlled fat compositions were used in these formulations based upon milkfat and soybean oil. The fats (either in the form of milkfat-based cream or as soybean oil, or as a blend thereof) were homogenized into a skim milk base to test the effect of these fats in milk upon vitamin E absorption and blood lipids. The groups were as follows:

Group 1 received 1% milk formulated with a 1:1 milkfat-soybean oil blend without added vitamin E.

Group 2 received 1.0% milk formulated with 100% milkfat and 200 IU/qt (50 IU per 8 oz. serving) of oil-soluble vitamin E (all-rac-α-tocopherol acetate) dissolved in the milkfat before homogenizing.

Group 3 received 1.0% milk formulated with a 1:1 milkfat-soybean oil blend and 200 IU/qt of oil-soluble vitamin E dissolved in the fat blend before homogenizing.

Group 4 received 1.0% milk formulated with 100% soybean oil and 200 IU/qt of oil-soluble vitamin E dissolved in the soybean oil before homogenizing.

Group 5 received skim milk with 200 IU/qt of water-dispersible vitamin E (all-rac-α-tocopherol acetate) blended into the skim milk before homogenizing.

Group 6 received one 100 IU vitamin E capsule per day before consuming limited-fat breakfasts.

Diets: Major dietary modifications were not introduced, with the exception that all subjects were asked to refrain from consuming any visible milkfat, including all milks outside of the study (other than skim milk limited to morning cereal or coffee for the capsule group 6), ice cream, butter, and cheese, including pizza. Milk groups were simply instructed to consume 8 oz. milk in the morning and another 8 oz. in the evening. The capsule group was asked to take one capsule in the morning before breakfast. Otherwise, participants were asked to maintain their usual diets and exercise regimens.

Milk Supply and Bookkeeping: All milk was prepared by H.P. Hood, Inc. (Chelsea, Mass.) to specification (see below). Pilot studies demonstrated the taste and mouth-feel acceptability of the various milks, as well as the stability of the added vitamin E. Milk was prepared prior to the study and frozen in half-gallon semi-opaque containers to be thawed as needed approximately 2–5 days prior to distribution to the participants. Subjects received their initial two days of milk servings under supervision in the assigned diet room so that they could be acclimated to the study and ask questions. Thereafter, a half gallon of milk (8 servings, 4 days) was dispensed along with a daily calendar on which milk intake and any unusual events affecting subjects' diets were recorded. Calendars and exit interviews were used to evaluate regimen compliance, in concert with the plasma tocopherol response.

Blood Analyses: After an overnight fast (12 h), 2 ml blood samples were collected at 0, 2 wks, and 4 wks by sterile technique and placed into 0.01 parts of 10% EDTA. Plasma was isolated by centrifugation at 250×g for 10 min at 4° C., and frozen at −80° C. for batch analysis at the end of the study. TC and TG were determined by enzymatic assays (Sigma Diagnostic kit, procedure #352 for cholesterol and procedure #336 for triglyceride). HDL-cholesterol was measured following $Mg^{2+}$ phosphotungstate precipitation using Sigma HDL cholesterol reagent #352-4. LDL-cholesterol was estimated after adjusting for VLDL-C based on plasma trigylcerides, according to Friedwell et al. (Clin. Chem. 18: 499–502, 1972). Plasma retinol and α-tocopherol were determined using high-performance liquid chromatography (HPLC) according to the method of Bieri et al. (Am. J. Clin. Nutr. 32: 2143–2149, 1979), Plasma retinol was recorded as a reference for individual sample stability.

Preparation of Vitamin E-Fortified Milks: Pasteurized nonfat (skim) milk containing 2,000 I.U. per quart vitamin A palmitate and 400 I.U. per quart vitamin $D_2$ was prepared by H.P. Hood, Inc. (Chelsea Mass.). Vitamin E (e.g., all-rac-α-tocopherol acetate) was obtained from the Watson Foods Co., Inc. (West Haven, Conn.) in an oil-soluble form (used in the 1% milks), and in a water-dispersible form (used in skim milk). The oil-soluble vitamin E was dissolved in cream (e.g., 40% milkfat-containing cream, or 20% fat-containing cream including 10% milkfat and 10% soybean oil) or in 100% soybean oil. Vitamin E concentrations in cream and soybean oil were typically 20 to 100 times greater than those desired in the final milks. Fortified cream or oil was then blended with non-fortified skim milk to make three vitamin E-fortified milks containing fat (see below). Skim milk was also fortified with vitamin E. The milks were then re-pasteurized, homogenized, cooled to 40° F., packaged in semi-opaque high density polyethylene (HDPE) blow-molded bottles (Shelburne Plastics, Inc.), and stored in the dark at 38° F. or frozen for later thawing and distribution as indicated above. Milk processing losses of vitamin E were measured and were compensated, by including an excess of vitamin E in the each milk formulation equal to the measured processing loss. Four milks were formulated as follows:

Milk #2: Regular 1% milkfat-containing milk was formulated by adding the appropriate amount of vitamin E-fortified cream containing 40% milkfat, to skim milk. Final concentration of vitamin E=199 IU/qt.

Milk #4: A 1% filled milk containing 1% soybean oil was prepared by adding 1 part vitamin E-fortified soybean oil blended with approximately 0.015–0.03 parts of a mono-and diglyceride emulsifier, to 99 parts of skim milk. The soybean oil (soybean salad oil, product no. 86-0700, Archer Daniels Midland Company, Decatur, Ill.) had been freshly refined and deodorized within approximately one week of use, had been sparged with nitrogen gas, and shipped to its destination under a blanket of nitrogen. After off-loading the oil, it was held in a storage tank under a blanket of nitrogen, refrigerated and stored in the dark to minimize development of any off-flavors. Final concentration of vitamin E=226 IU/qt.

Milk #3: A 1% filled milk containing a 50–50 combination of milkfat and soybean oil was prepared by adding 1 part of a 20% fat-containing cream to 19 parts of skim milk. The 20% cream (100 g) was prepared by blending 10 soybean oil, 70 g whole milk containing 3.25% milkfat, 19.3 g of 40% milkfat-containing cream, 0.3 g emulsifier (mono- and diglycerides), and at least a 20-fold higher concentration of vitamin E than that measured in the final milk product. Final concentration of vitamin E=224 IU/qt.

Milk #5: Skim milk fortified with vitamin E was prepared by adding water-dispersible vitamin E, and then pasteurizing and homogenizing the milk to assure microdispersal of the vitamin. Final concentration of vitamin E=232 IU/qt.

Initial testing of the pasteurized, homogenized filled milks (#3 and #4) over a 14 day interval (standard shelf-life for milk) showed that their fats and creams had no more tendency to separate from the skim milk portion than did the fat in the regular 1% milkfat-containing milk (milk #2). Vitamin E stability was tested for milk #3. After two weeks storage (the nominal shelf-life) of the milk in the dark at 38° F., approximately 95% of the original vitamin E content, measured following pasteurization and homogenization, remained.

TABLE 2

Clinical Study With Milks Providing 100 IU Per Day of Vitamin E

| Plasma | Milk #1 (1% fat blend, no E) | Milk #2 (1% milkfat + E) | Milk #3 (1% fat blend + E) | Milk #4 (1% soybean oil + E) | Milk #5 (skim + E) | Capsules #6 (100 IU control) |
|---|---|---|---|---|---|---|
| Total cholesterol (mg/dL) | | | | | | |
| 0 week | 167 ± 23 | 147 ± 25 | 155 ± 29 | 157 ± 32 | 166 ± 18 | 137 ± 35 |
| 2 weeks | 179 ± 29 | 161 ± 29 | 145 ± 33 | 165 ± 41 | 161 ± 30 | 143 ± 34 |
| 4 weeks | 168 ± 24 | 147 ± 28 | 146 ± 42 | 163 ± 39 | 159 ± 21 | 138 ± 34 |
| HDL (mg/dL) | | | | | | |
| 0 week | 44 ± 13 | 45 ± 10 | 45 ± 8 | 49 ± 9 | 47 ± 8 | 42 ± 9 |
| 2 weeks | 45 ± 13 | 44 ± 14 | 44 ± 8 | 47 ± 9 | 45 ± 5 | 42 ± 7 |
| 4 weeks | 43 ± 13 | 43 ± 11 | 47 ± 9 | 47 ± 8 | 45 ± 5 | 42 ± 8 |
| LDL (mg/dL) | | | | | | |
| 0 week | 105 ± 19 | 86 ± 19 | 95 ± 22 | 88 ± 28 | 99 ± 18 | 81 ± 28 |
| 2 weeks | 113 ± 21 | 100 ± 19 | 87 ± 25 | 99 ± 38 | 95 ± 28 | 84 ± 26 |
| 4 weeks | 107 ± 18 | 90 ± 23 | 84 ± 35 | 93 ± 34 | 95 ± 19 | 78 ± 28 |

TABLE 2-continued

Clinical Study With Milks Providing 100 IU Per Day of Vitamin E

| Plasma | Milk #1 (1% fat blend, no E) | Milk #2 (1% milkfat + E) | Milk #3 (1% fat blend + E) | Milk #4 (1% soybean oil + E) | Milk #5 (skim + E) | Capsules #6 (100 IU control) |
|---|---|---|---|---|---|---|
| LDL/HDL (ratio) | | | | | | |
| 0 week | 2.56 ± 0.69 | 1.95 ± 0.45 | 2.14 ± 0.47 | 1.85 ± 0.71 | 2.16 ± 0.54 | 1.97 ± 0.70 |
| 2 weeks | 2.61 ± 0.60 | 2.40 ± 0.64 | 1.99 ± 0.46 | 2.20 ± 1.03 | 2.13 ± 0.60 | 2.01 ± 0.64 |
| 4 weeks | 2.65 ± 0.73 | 2.20 ± 0.78 | 1.81 ± 0.68 | 2.03 ± 0.84 | 2.15 ± 0.45 | 1.91 ± 0.77 |
| Triglycerides (mg/dL) | | | | | | |
| 0 week | 94 ± 25 | 81 ± 16 | 70 ± 25 | 102 ± 28 | 96 ± 28 | 71 ± 18 |
| 2 weeks | 100 ± 15 | 87 ± 17 | 70 ± 29 | 95 ± 29 | 108 ± 22 | 88 ± 34 |
| 4 weeks | 87 ± 25 | 72 ± 19 | 76 ± 21 | 112 ± 49 | 92 ± 23 | 91 ± 38 |
| Vitamin A (µg/dL) | | | | | | |
| 0 week | 40 ± 5 | 42 ± 10 | 41 ± 8 | 45 ± 7 | 49 ± 10 | 36 ± 6 |
| 2 weeks | 41 ± 5 | 42 ± 11 | 42 ± 11 | 45 ± 12 | 48 ± 13 | 38 ± 8 |
| 4 weeks | 42 ± 7 | 41 ± 10 | 42 ± 7 | 47 ± 13 | 49 ± 12 | 37 ± 6 |
| Vitamin E (µg/dL) | | | | | | |
| 0 week | 1002 ± 145 | 875 ± 169 | 904 ± 197 | 1038 ± 208 | 1005 ± 114 | 876 ± 209 |
| 2 weeks | 1111 ± 239 | 1620 ± 262‡ | 1558 ± 420‡ | 1767 ± 394‡ | 1698 ± 344‡ | 1245 ± 404‡ |
| 4 weeks | 1053 ± 203 | 1597 ± 181‡ | 1715 ± 533‡ | 1941 ± 443‡ | 1831 ± 201‡ | 1204 ± 382‡ |
| Vitamin E/Cholesterol ratio (µmol/mmol) | | | | | | |
| 0 week | 5.44 ± 0.77 | 5.38 ± 0.92 | 5.31 ± 1.10 | 5.96 ± 0.69 | 5.51 ± 0.94 | 5.82 ± 0.79 |
| 2 weeks | 5.62 ± 0.97a,b,c,d,e | 9.11 ± 1.28a,f | 9.61 ± 1.35b,g | 9.80 ± 1.87c,h | 9.55 ± 1.80d,I | 7.77 ± 1.12e,f,g,h,i |
| 4 weeks | 5.62 ± 0.71a,b,c,d,e | 9.96 ± 1.42a,f | 10.62 ± 1.56b,g | 10.86 ± 2.22c,h | 10.53 ± 1.88d,I | 7.76 ± 1.05e,f,g,h,i |
| Δ Vitamin E/Cholesterol ratio (% increase from 0 week) | | | | | | |
| 2 weeks | 7 ± 8a,b,c,d,e | 71 ± 24a,f | 84 ± 25b,g | 64 ± 24c,h | 75 ± 30d,I | 36 ± 31e,f,g,h,i |
| 4 weeks | 5 ± 15a,b,c,d,e | 89 ± 41a,f | 103 ± 33b,g | 82 ± 29c,h | 93 ± 32d,I | 37 ± 36e,f,g,h,i |

Values are mean ± SD (n = 8)
a,b,cMeans in a row sharing a common letter are statistically different ($p < 0.05$) using one-way ANOVA and Fisher's PLSD test.
‡Means in column statistically different ($p < 0.05$) from 0 week value using repeated-measure ANOVA and Sheffe's F-test.
Table 2 Conversions:
Total cholesterol (TC), HDL or LDL (in mmol/L) = TC, HDL or LDL (in mg/dL) ÷ 38.7
Triglycerides (TG) in mmol/L = TG (in mg/dL) ÷ 88.6
Vitamin A in µmol/L = vitamin A (in µg/dL) ÷ 28.65
Vitamin E in µmol/L = vitamin E (in µg/dL) ÷ 43.1

Clinical Study #1 Results and Conclusions

In the four week clinical study described above, 48 human subjects received 100 IU per day of vitamin E (as all-rac-α-tocopherol acetate) either microdispersed in milks or in soft-gel capsules (see Table 2). It was discovered that ingesting vitamin E which had been microdispersed (homogenized) into various milks allowed remarkably efficient absorption of the vitamin into the blood, even in the absence of fat in the milk, i.e., in skim milk. In Table 2 it is evident that with milks #2, 3, 4 and 5, the average percentage increase in the ratio of plasma vitamin E to cholesterol after 2 weeks of drinking vitamin E-supplemented milks was 74%, and after 4 weeks, 92%, as compared with the average 36-37% increase from daily ingestion of 100 IU vitamin E in gelatin capsules (experimental control). Princen et al. (Arterioscler. Thromb. Vasc. Biol., 15: 325–333, 1995) measured essentially the same increase (35%) above the basal fasting plasma vitamin E/cholesterol ratio when they tested human subjects ingesting the same 100 IU capsule dose of α-tocopherol acetate per day for two weeks. In this study, Princen et al. also measured 65% and 115% increases respectively, above the basal fasting plasma vitamin E/cholesterol ratio for subjects ingesting 200 IU and 400 IU of α-tocopherol acetate per day in capsule form for two weeks.

The 92% average increase in the vitamin E/cholesterol ratio for milks in the present study, falls approximately half way between the 65% and 115% increases obtained from the data of Princen et al. (see, FIG. 1). Accordingly, Applicants estimate that the presently described daily dosage of 100 IU of all-rac-taocopherol acetate microdispersed in milk is equivalent to a capsule dosage of approximately 300 IU. Comparing Applicant's results (92% average increase in plasma vitamin E/cholesterol ratio) with results from still other laboratories, they reach levels which are just as high as the 65%–95% increases for daily consumption of 400 IU of α-tocopherol (or α-tocopherol acetate) in gelatin capsules over 4 weeks (Dimitrov et al., Am. J. Clin. Nutr. 1991; 53: 723–729; and Dimitrov et al., Am. J. Clin. Nutr. 1996; 64: 329–335). Applicant's 92% increase in plasma vitamin E over four weeks of ingesting milk delivering 100 IU vitamin E per day is also roughly comparable to the average 83% increase reported after six years of 400 IU vitamin E supplementation reported in Berson et al. (Arch. Opthalmol., 111(6): 761–772, 1993). In Berson et al., 601 subjects consumed the all-rac-α-tocopherol acetate daily in a soft gel capsule.

In a study on the ability of long term ingestion of vitamin E to reduce the incidence of myocardial infarction (abbreviated MI or heart attack) in patients having a documented condition of coronary atherosclerosis, Stephens et al. (Lancet, 347, 781–786, 1996), demonstrated that sustained supplementation of the patients' diets with as little as 400 IU of RRR-α-tocopherol ingested once per day in capsules was sufficient to reduce the risk of non-fatal heart attacks by 77%. This protective effect became apparent after about 200 days of treatment with the vitamin. In these coronary patients, the 400–800 IU daily dose of the vitamin resulted in an average 70% elevation (34.2 μmol/L elevated to 58 μmol/L) in the plasma vitamin E level above the basal fasting level measured in the same subjects before beginning vitamin E treatment.

By remarkable coincidence, whole milk (4–5 oz.) was used to swallow the 400–800 IU daily capsule doses of vitamin E in the two Dimitrov et al. studies cited above. However this milk, when ingested along with the capsules, failed to boost plasma levels of vitamin E even beyond those levels reported by Applicants, who provided a much smaller dose(100 IU) microdispersed in milk. This observation indicates that vitamin E must be microdispersed within a milk as described herein, for efficient vitamin E absorption to occur. Again, Applicant's clinical study has shown conclusively that daily consumption of two 8 ounce servings of any one of several different milks (including skim milk, regular milk, and polyunsaturated vegetable oil filled milk) containing 100 IU of microdispersed α-tocopherol acetate per 16 ounces, causes increases in the plasma level of vitamin E and the vitamin E/cholesterol ratio that are 2.5–3 times as great as the increases resulting from daily ingestion of 100 IU vitamin E capsules (e.g., 92% vs. 37%).

Contrary to expectations from the references described above, the presence of fat and the type of fat (saturated or polyunsaturated) described herein, only slightly affected the steady state level of vitamin E and the vitamin E/cholesterol ratio in the bloodstream after 4 weeks of supplemented milk consumption (see Table 2). That is, skim milk (fat-free), filled milk containing 1% soybean oil, filled milk containing a blend of 0.5% milkfat and 0.5% soybean oil, and regular milk containing 1% milkfat (saturated fat) all functioned as surprisingly good vitamin E carriers, resulting in unexpectedly efficient absorption of the vitamin from the gastrointestinal (GI) tract and incorporated into circulating lipoproteins in the bloodstream. Similarly, ingestion of each of these vitamin E-fortified milks caused the plasma ratio of vitamin E to total cholesterol to be approximately doubled (relative to the 0 week ratio) after 4 weeks of consuming 100 IU of the vitamin per day in these milks.

Any one of several commercially available forms of vitamin E, which may have either somewhat higher or lower specific activities (IUs per mg) may be substituted for, or combined with the all-rac-α-tocopherol acetate used in the present clinical study. These include all-rac-α-tocopherol acetate, all-rac-α-tocopherol, RRR-α-tocopherol acetate, and RRR-α-tocopherol. The esterified synthetic form of vitamin E used in this clinical study (all-rac-αtocopherol acetate) is chemically stable, fat-soluble, has a long shelf-life, and is hydrolyzed to the free alcohol form of the vitamin in the GI tract. Whichever form(s) of vitamin E is selected, the vitamin should be uniformly dispersed throughout the milk, e.g., by homogenization or by adding a pre-emulsified water-dispersible form of the vitamin.

Another aspect of the present invention is concerned with the ratio of vitamin E to cholesterol measured in the bloodstream following consumption of milk supplemented with microdispersed vitamin E. The greater this ratio is, the greater is the protection of LDL cholesterol against oxidation. Such anti-oxidant protection can help to control the progression of atherosclerosis. It is evident in Table 2 that the ratio of vitamin E to cholesterol can be essentially doubled (over the basal value before supplementation) after two to four weeks of ingesting 100 IU-vitamin E-supplemented milks (see milks #2 through #5, average ratio of 5.54:10.49). By contrast, ingesting the 100 IU vitamin E capsules resulted in only a one-third increase over the basal value (5.82:7.76).

As described above, when between approximately one and two parts by weight milkfat, a saturated fat, is combined with between approximately one and two parts by weight of a polyunsaturated fat such as non-hydrogenated soybean oil, a "balanced fat" composition is obtained. The ability of such a balanced dietary fat to decrease the LDL/HDL ratio in humans has been demonstrated previously (Sundram et al., U.S. Pat. No. 5,578,334 and Sundram et al., U.S. Pat. No. 5,843,497). In the present invention (see Table 1, gerbil study), when a balanced fat is used as the delivery vehicle for vitamin E, the saturated fat appears to increase the uptake of vitamin E into the bloodstream faster than it increases undesirable LDL and total cholesterol levels. Comparing the vitamin E to cholesterol ratios for the balanced fat composition, and the polyunsaturated fat composition in Table 1, it is apparent that the ratio of vitamin E to cholesterol in the plasma is greater (better) when milkfat is present than when it is excluded, and only polyunsaturated fat (soybean oil) is present. This vitamin E to cholesterol ratio is important because CHD and atherosclerosis is coupled to LDL oxidation which can be controlled, i.e., reduced, by increasing the proportion of vitamin E to cholesterol in the bloodstream. Thus, it is beneficial to both improve overall absorption of vitamin E from the G.I. tract, and attempt to decrease the ratio of LDL to HDL. A selective increase in the ratio of vitamin E to cholesterol for any one of the milks in Table 2(#2 through #5) would not be apparent because 16 oz of a 1% milk represents so little (4.5 g per day) of the daily dietary fat. To observe this effect, a human clinical study analogous to the gerbil study would be required, in which greater than 50% of the dietary fat would be provided by the balanced fat.

The value of ingesting supplemental vitamin E delivered in a form which is more efficiently absorbed, (i.e., microdispersed in milk as described herein) becomes apparent after considering the large body of experimental data demonstrating that only 10% to 35% of ingested α-tocopherol is absorbed into the bloodstream (H. Gallo-Torres in *Vitamin E: A Comprehensive Treatise,* see above).

Furthermore, it is now appreciated that even a high daily intake of vitamin E, e.g., 800 IU per day, over an extended period of time causes no detectable side-effects, based upon extensive measurements of metabolite levels and functionalities in the blood, e.g., many different enzyme and hormone level tests, antibodies, protein, sugar, lipid levels, red and white cells, platelet number, bleeding time, hemoglobin, hemocrit, neutrophil killing of yeast, and other functional tests performed on the blood and urine (Meydani et al., Am. J. Clin. Nutr. 68: 311–318, 1998). Similarly, Dickinson, A. A., *The Benefits of Nutritional Supplements,* Council for Responsible Nutrition (1998), (see p.47) indicates that no adverse effects have been observed with ingestion of 1200 IU per day. No level at which adverse effects are observed has been established.

Up to the present time, published studies have provided little motivation for supplementing foods with vitamin E, because, for example, at least two foods, including margarine and breakfast cereal, did not enhance vitamin E absorption (relative to the published data for absorption from capsules). In fact, without the knowledge that a particular food improves the absorption of vitamin E, and that the vitamin is chemically stable in this food, it would be prudent to consume the vitamin supplement in capsule form in which the vitamin is at least known to be stable. Accordingly, because of the surprising nature of the results reported herein, the present invention encompasses compositions and methods involving microdispersed vitamin E in milk products at supplementation levels which conveniently provide doses of least 50 IU per day, and preferably at least 100 IU per day.

The present invention also describes milk products containing vitamin E, to which a polyunsaturated fat or fats have been added to improve the balance between saturated and polyunsaturated fatty acids (see above), and wherein vitamin E absorption is essentially undiminished compared to the same milk product containing milkfat in place of the polyunsaturated fat. While this addition of polyunsaturated fat has the potential (as in gerbils) to beneficially decrease plasma LDL, it was also expected to undesirably decrease vitamin E uptake. On the other hand, saturated fat which is known to undesirably increase plasma LDL, was expected to beneficially increase vitamin E uptake. A priori, given this apparent paradox, it was impossible to predict whether the important ratio of vitamin E to LDL cholesterol in the bloodstream would increase, decrease, or remain essentially constant as a polyunsaturated fat is added to a saturated fat to produce a balanced fat composition (see above). Compared to regular milkfat alone, a 50—50 blend of soybean oil and milkfat as the carrier vehicle for vitamin E produces either approximately the same, or a slightly better ratio of vitamin E to LDL cholesterol in the bloodstream. This favorable result taken together with the important decreases in plasma LDL cholesterol and LDL/HDL cholesterol ratio accompanying substitution of soybean oil for half of the milkfat (gerbil study), provides ample rationale for using a balanced fat composition for delivering vitamin E in a milk product.

HUMAN CLINICAL STUDY #2

Background and Objective: The surprising results of the first clinical study raised several important questions. First, would increasing the daily dose of vitamin E microdispersed in milk from 100 IU to 200 IU per day, increase the absorption of vitamin E proportionately compared to vitamin E-containing gel capsules? Second, would the enhanced absorption of vitamin E from milk be duplicated with microdispersal of the vitamin in another beverage, or is there, perhaps, some property of milk which promotes vitamin E absorption? The results from clinical study #1 (which demonstrated hyper-absorption of vitamin E from fat-free milk) indicate that fat, per se, is not required for efficient absorption of vitamin E from a beverage. Orange juice is also fat-free, and like milk, is a beverage consumed by a large proportion of the population. It would be beneficial to know whether orange juice is just as efficient an agent as milk for promoting vitamin E absorption, and whether it provides a suitably stable storage environment for this vitamin. Further, it would be important to the understanding of CHD risk, to determine whether the increased plasma vitamin E level achieved with regular ingestion of vitamin E-supplemented milk would be reflected in any diagnostic index of atherogenic risk such as the ex vivo rate of LDL oxidation.

Accordingly, a second study was designed to determine whether the increase in the steady state plasma level of vitamin E and the ratio of vitamin E to cholesterol in the bloodstream is greater in people ingesting a supplement of 200 IU per day vitamin E (all-rac-$\alpha$-tocopherol acetate) dispersed in milk (containing 1% fat as a 50—50 blend of soybean oil and milkfat), or the same vitamin E supplement dispersed in orange juice. Orange juice, which already provides one antioxidant in the form of vitamin C, is a good candidate to test for vitamin E supplementation, and a food manufacturer has provided up to 30 IU of all-rac-$\alpha$-tocopherol acetate per 8 ounce serving of orange juice. In the present study, the level of vitamin E in all beverages was set at 100 IU per serving, with two servings consumed per day (morning and evening), to provide 200 IU per day (twice the level in clinical study #1). This dosage increase was to determine the incremental benefit, if any, resulting from doubling the vitamin E supplementation level. As an additional question in this clinical study, Applicants wished to determine whether the ester derivative of a "natural form" of vitamin E (RRR-$\alpha$-tocopherol acetate) would provide any measurable benefit over synthetic vitamin E (all-rac-$\alpha$-tocopherol acetate) when microdispersed at the same concentration (100 mg per 8 ounce serving) in the same 1% milk described above.

Human subject volunteers were selected from the same pool of subjects ingesting vitamin E in milks in the first clinical study. With this design, each person serves as their own control, thereby removing much of the variability inherent between individuals, and permitting comparison of results for individuals in this study with results for the same individuals in the first clinical study. As in the first study, the overall plasma lipoprotein profile and the vitamin E status were monitored, as well as the plasma level of vitamin A (to look for any competition by an increase in vitamin E level).

Rationale: The rationale for carrying out this study is similar to the first, except that the daily intake of supplemental vitamin E was increased to 200 IU per day (provided by two 100 IU doses of vitamin E microdispersed in either 1% fat-containing milk or in orange juice). Given the many health benefits of vitamin E, it could be efficacious to fortify a common food source such as milk and/or orange juice with 200 IU per day of this vitamin rather than 30 or 100 IU. The economy of such fortification would depend upon whether this increased level of vitamin E can be as efficiently absorbed and incorporated into lipoproteins when compared with a lower level of the vitamin. This study is also intended to compare the steady state plasma vitamin E levels resulting from ingesting the same quantities of natural and synthetic α-tocopherol acetate (200 IU per day in milk). Moreover, in considering both milk and orange juice as delivery vehicles for vitamin E, both the chemical stability of the vitamin, and the efficiency of vitamin absorption into the bloodstream must be considered and measured for each beverage.

Preparation of Vitamin E-Fortified Milks and Orange Juice: Preparation of milks, and the packaging and storage of milks and orange juice by H.P. Hood, Inc. (Chelsea Mass.) were carried out as described for milks in the first clinical study. Milk and orange juice processing losses of vitamin E were measured and were compensated for, by including an excess of vitamin E in the each beverage formulation equal to the measured processing loss.

Stability of Vitamin E in Fortified Milks and Orange Juice During Storage: Vitamin E is an antioxidant which, under refrigerated storage conditions, is still susceptible to air-oxidation and oxidation by interaction with chemicals in foods. Therefore, under many storage conditions, foods supplemented with vitamin E have a limited shelf-life. Vitamin E levels were assayed in a number of different milks and in orange juice stored in the dark in sealed polyethylene half-gallon jugs at 38° F. Table 3 below shows the results of duplicate or triplicate assays of oil-dispersible synthetic vitamin E (all-rac-α-tocopherol acetate, abbreviated "all-rac E, oil"), and oil-dispersible natural vitamin E (RRR-α-tocopherol acetate, abbreviated "RRR-E, oil") dispersed in a filled milk formulated with 1% fat containing a 50—50 blend of milkfat and soybean oil (abbreviated "50—50 milk"). The stability of all-rac E, oil was also monitored in regular 1% milkfat-containing milk (abbreviated "regular milk"). In addition, the stability of water-dispersible synthetic vitamin E (all-rac-α-tocopherol acetate, abbreviated "all-rac E, water") was monitored in both fat-free milk (abbreviated "skim milk") and orange juice (abbreviated OJ). Although the starting levels of vitamin E were not identical in the beverages studied, all products were stored identically (see above) up to the time of the vitamin assay. Since the nominal shelf-life for milk is two weeks, and for refrigerated orange juice is four weeks, comparisons of vitamin E losses were made after three weeks storage.

Stability Results: In Table 3 it is apparent that regardless of whether the milk was fat-free or contained milkfat or the fat blend, and regardless of whether the vitamin E acetate was from a synthetic or natural source, the extent of vitamin E loss after 3 weeks of refrigeration was 16±2%. By contrast, vitamin E loss in orange juice was 27%. After 4 weeks (the nominal shelf-life for orange juice), this loss in orange juice had increased to 31% (essentially twice the proportion of vitamin E lost in milk). These results indicate that for refrigerated storage, and with the use of the above-described conventional packaging materials, milk provides a more stable chemical environment for maintaining, i.e., minimizing loss of, microdispersed vitamin E.

TABLE 3

Loss of Vitamin E Microdispersed in Milk and Orange Juice*
(Values in mgs. of vitamin E per 8 oz. serving)**

| Vitamin:<br>Beverage: | all-rac E,<br>oil<br>regular<br>milk | all-rac E,<br>oil<br>50–50<br>milk | RRR-E,<br>oil<br>50–50 milk | all-rac E,<br>water<br>skim milk | all-rac E,<br>water<br>OJ |
|---|---|---|---|---|---|
| Storage Time | | | | | |
| 0 wks. | 93 ± 4 | 98 ± 15 | 96 ± 6 | 134 ± 6 | 168 ± 3 |
| 3 wks. | 80 ± 13 | 82 ± 4 | 79 ± 2 | 112 ± 3 | 123 ± 6 |
| Loss after 3 wks: | 14% | 16% | 18% | 16% | 27% |

*Samples were stored at 38° F. in the dark
**Values are means ± SD (n = 2–3). Vitamin E concentrations were determined using HPLC, and a modification of the method of Bieri et al. (Am J Clin Nutr 32: 2143–2149, (1979).

Design of Clinical Study #2 on Vitamin E Absorption from Milk and Orange Juice

Subjects: Twenty-four healthy male and female volunteers recruited from the Brandeis University community, and enrolled in the first clinical study, were re-enrolled in this study after a "wash-out" period of more than 8 weeks during which the subjects consumed no vitamin or mineral supplements.

Groups: An initial blood sample was drawn in order to assess plasma TC, LDL, HDL and TGs as well as α-tocopherol and vitamin A status. Cholesterol cut-off for entry into the study was set at <225 mg/dL, with α-tocopherol at <1250 mg/dL (29 μmol/L). Group assignment was similar to the first study except that only three groups of eight subjects per group were studied. With two of the groups, subjects consumed two 8 oz. glasses of milk per day, for a period of four weeks, while subjects in the third group consumed two 8 oz. glasses of orange juice per day. The subjects in the two milk-consuming groups (#6 and #8) were assigned to a filled milk containing 1% fat (a 50—50 blend of soybean oil and milkfat). This milk was the same as milk #3 in the first clinical study except that the vitamin E was present at a level of 100 mg per serving rather than 50 mg. Natural vitamin E (RRR-α-tocopherol acetate) was utilized with group #6 whereas synthetic vitamin E (all-rac-α-tocopherol acetate) was utilized with group #8. Subjects in the third group were assigned to orange juice (OJ group) containing 100 mg of water-dispersible all-rac-α-tocopherol acetate (the same vitamin preparation added to skim milk in the first clinical study). As in the first clinical study, subjects consumed either two 8 ounce glasses of milk or orange juice per day, one glass with breakfast, and one with dinner. In summary, all subjects received a dosage of approximately 200 mg per day of vitamin E, and:

Group 6 received 1.0% milk formulated with a 1:1 milkfat-soybean oil blend and 415 mg/qt (564 IU) of oil-soluble RRR-α-tocopherol acetate dissolved in the fat blend before homogenizing.

Group 8 received 1.0% milk formulated with a 1:1 milkfat-soybean oil blend and 424 mg/qt (424 IU) of oil-soluble all-rac-α-tocopherol acetate dissolved in the fat blend before homogenizing, and Group OJ received orange juice containing 424 mg/qt (424 IU) per quart of water-dispersible all-rac-α-tocopherol acetate Diets: Same as in first clinical study, and participants were asked to maintain their usual diets and exercise regimens.

Beverage Supply and Bookkeeping: As in the first clinical study, milks (and orange juice) were prepared by H.P. Hood, Inc. (Chelsea, Mass.) to specification. Four week studies compared the stabilities of all-rac-α-tocopherol acetate in milk versus orange juice, as well as the stability of RRR-α-tocopherol acetate in milk (see below). Milk and orange juice were prepared as described above prior to the study, frozen in half-gallon semi-opaque containers which were stored in the dark, and thawed as needed approximately 2–5 days prior to distribution to the participants. Subjects received beverages, and were monitored and interviewed for regimen compliance as in the first study.

Blood Analyses: After an overnight fast (12 h), 10 ml blood samples were collected at 0 and 4 wks by sterile technique into standard Vacutainers® (Becton Dickinson Company), with 0.10% EDTA. This quantity of blood allowed fractionation of sufficient quantities of LDL-cholesterol for comparative measurements of LDL oxidation rates before and after the 4 week vitamin E supplementation period as described below. Plasma was isolated, and plasma components quantitated as described for the first clinical study.

TABLE 4

Clinical Study With Milks and Orange Juice Providing Approximately 200 mg Per Day of Vitamin E

| | Milk #6 (1% fat blend + nat.E) | Milk #8 (1% fat blend + syn.E) | OrangeJuice (+syn.E) |
|---|---|---|---|
| PLASMA Total cholesterol (mg/dL) | | | |
| 0 week | 157 ± 29 | 177 ± 27 | 160 ± 27 |
| 4 weeks | 146 ± 22 | 161 ± 38 | 159 ± 57 |
| HDL (mg/dL) | | | |
| 0 week | 50 ± 12 | 49 ± 11 | 49 ± 10 |
| 4 weeks | 47 ± 12 | 54 ± 10 | 46 ± 8 |
| LDL (mg/dL) | | | |
| 0 week | 87 ± 18 | 101 ± 19 | 94 ± 24 |
| 4 weeks | 84 ± 18 | 90 ± 33 | 96 ± 30 |
| LDL/HDL (ratio) | | | |
| 0 week | 1.84 ± 0.57 | 2.30 ± 0.37 | 2.04 ± 0.77 |
| 4 weeks | 1.89 ± 0.62 | 1.66 ± 0.46 | 2.16 ± 0.84 |
| Triglycerides (mg/dL) | | | |
| 0 week | 81 ± 18 | 80 ± 25 | 87 ± 36 |
| 4 weeks | 76 ± 33 | 84 ± 33 | 86 ± 57 |
| Vitamin A (μg/dL) | | | |
| 0 week | 41 ± 7 | 39 ± 8 | 42 ± 9 |
| 4 weeks | 41 ± 10 | 38 ± 7 | 40 ± 8 |
| Vitamin E (μg/dL) | | | |
| 0 week | 861 ± 235 | 966 ± 170 | 967 ± 230 |
| 4 weeks | 1786 ± 441‡ | 2108 ± 705‡ | 1651 ± 406‡ |
| Vitamin E/Cholesterol (μmol/mmol) | | | |
| 0 week | 5.08 ± 1.17 | 4.96 ± 0.83 | 5.40 ± 0.80 |
| 4 weeks | 11.09 ± 1.87‡ | 11.95 ± 3.46‡ | 9.39 ± 1.70‡ |
| Δ Vitamin E/Cholesterol (% increase from 0 week) | | | |
| 4 weeks | 122 ± 26a | 137 ± 45b | 75 ± 30a,b |
| LDL Fraction Δ Vitamin E/Cholesterol (% increase from 0 week) | | | |
| 4 weeks | 107 ± 24a | 111 ± 36b | 68 ± 19a,b |
| LDL oxidation lag time (min) | | | |
| 0 week | 46 ± 11 | 39 ± 10 | 43 ± 15 |
| 4 weeks | 94 ± 14‡ | 85 ± 31‡ | 72 ± 20‡ |
| Δ LDL oxidation lag time (% increase from 0 week) | | | |
| 4 weeks | 104* | 118* | 67* |

Values are mean ± SD (n = 7 – 8)
a,bMeans in a row sharing a common letter are statistically different (p < 0.05) using one-way ANOVA and Fisher's PLSD test
‡4 week mean statistically different from 0 wk. (p < 0.05) using one-way ANOVA and Sheffe's F-test
* Calculated as group averages Clinical Study #2 Results and Conclusion In the four week clinical study described above, 24 human subjects received approximately 200 mg per day of vitamin E in two divided doses microdispersed in either a 1% filled milk which contained a 50—50 blend of milkfat and soybean oil, or in orange juice (100 mg doses of vitamin E in 8 ounces of beverage). Eight subjects received the oil-dispersible form of all-rac-α-tocopherol acetate in the milk, eight others received the oil-dispersible form of RRR-α-tocopherol acetate in an identical filled milk, and eight additional subjects received the water-dispersible form of all-rac-α-tocopherol acetate in orange juice. Four weeks of ingesting these 200 mg per day doses of vitamin E increased the average fasting plasma vitamin E/cholesterol ratio by approximately 75% for the supplemented orange juice, and 130% for the supplemented milks (average of 122% for milk #6 and 137% for milk #8, see Table 4). These 75% and 130% increases slightly exceed the 65% and 115% increases in the plasma vitamin E/cholesterol ratio (over basal values) measured by Princen et al. (Arterioscler. Thromb. Vasc. Biol., 15: 325–333, 1995) for subjects ingesting daily gel capsules providing 200 mg (IU) and 400 mg of all-rac-α-tocopherol acetate, respectively.

In summary, the benefit from ingesting 200 mg per day of vitamin E in milk is somewhat greater than ingesting 400 mg of all-rac-α-tocopherol acetate in capsules (130% versus 115% vitamin E/cholesterol ratio increases respectively). In fact, ingesting 200 mg per day of vitamin E in milk, doubles the effectiveness of a daily capsule dose of 200 mg vitamin E (130% average increase in plasma vitamin E/cholesterol ratio for milk versus 65% for capsules). Furthermore, the benefit from ingesting 200 mg (IU) per day of vitamin E in orange juice is about comparable to ingesting the same dose in capsules (75% versus 65% increases respectively). Six out of the eight subjects who ingested orange juice supplemented with 200 IU all-rac-α-tocopherol acetate for 4 weeks in the clinical study #2, had been "crossed-over" from ingesting milk with 100 IU all-rac-α-tocopherol acetate in clinical study #1 (Table 2). An 8 week supplement-free "wash-out" period separated these two studies. The subjects' average percentage increase in their fasting vitamin E/cholesterol ratios (above their basal ratio values) were as follows:

(a) milk providing 100 IU vitamin E per day elicited an 86% increase (b) orange juice providing 200 IU vitamin E per day elicited a 75% increase This result, taken together with the above summary information, clearly suggests that milks (and other dairy products) are superior to non-dairy foods and beverages such as orange juice. Even gel capsules may be superior to refrigerated orange juice as a delivery vehicle for vitamin E. That is, while vitamin E is very stable in gel capsules, there is a significant loss of the vitamin during 3 or 4 weeks refrigerated storage of orange juice, and this loss is greater than that in milk (Table 3). Furthermore, the water-dispersible form of all-rac-α-tocopherol acetate required for incorporation into orange juice is approximately twice as expensive (per IU) as the oil-dispersible form which is typically used in gel capsules, and which can be used in any fat-containing milk.

As a separate matter, the steady state plasma levels of vitamin E were measured and compared in subjects ingesting milks which differed only in the source of vitamin E [natural (RRR) versus synthetic (all-rac)]. It is evident from the side-by-side comparison of these milks (containing approximately equal milligram concentrations of either the natural or synthetic vitamin E acetate), that both forms of the vitamin generate very similar levels of vitamin E in the bloodstream (Table 4). Furthermore, both forms of the vitamin appear to possess similar specific activities in protecting LDL cholesterol in the bloodstream against oxidation. This conclusion is supported by similar ex vivo LDL oxidation "lag times" which have been experimentally measured using LDL cholesterol fractionated from the plasma of subjects who consumed milk supplemented with one form of the vitamin or the other (see below).

Results from the first clinical study indicate that a modest level of vitamin E supplementation (i.e., 100 mg per day), provided in various milks (regular, skim and filled milks) has a much greater dose-effectiveness than capsules, i.e., a 92% average increase in plasma vitamin E/cholesterol at 4 weeks for the milks (Table 2), compared to a 35%–37% increase in plasma E/cholesterol for 100 IU capsules (data from Princen et al. cited above, and Table 2).

Results from other laboratories indicate that, as capsule doses of vitamin E are increased above approximately 400 IU per day, the vitamin level in the bloodstream begins to plateau. For example, Princen et al. showed that between 25 IU and 400 IU, each time the daily capsule dose was doubled (to 50 IU, 100 IU, 200 IU, 400 IU) the plasma vitamin E/cholesterol ratio increased an average of approximately 75% over the previous ratio. However, as the daily capsule dose was doubled from 400 IU to 800 IU, the plasma vitamin E/cholesterol ratio increased less than 40%. Therefore, it would be expected that above a certain daily dose of vitamin E in milk, the plasma level of the vitamin also would begin to plateau. After 4 weeks of consuming 200 mg per day of either synthetic or natural α-tocopherol acetate in milk, the ratio of plasma E to cholesterol had increased (above the basal value) an average of 130% (Table 4). This moderate increase, which is 41% greater than the 92% average increase in plasma E/cholesterol achieved with consuming half as much vitamin E (100 IU) in milk (Table 2), suggests somewhat diminishing returns from further increases in vitamin E supplementation.

EX VIVO-IN VITRO LDL OXIDATION

Rationale: Epidemiological studies have shown that the risk of coronary heart disease (CHD) is significantly lower in people taking vitamin E supplements (Rimm et al., *N. Engl. J Med.* 328:1450–1456, 1993; Stampfer et al., *N. Engl. J Med.* 328:1444–1449, 1993). It is generally believed that the effect of vitamin E in reducing cardiovascular disease may be due to the inhibition of LDL oxidation and reducing subsequent damage to the arterial intima. It has been shown experimentally that dietary supplements of vitamin E can inhibit oxidation of LDL from supplemented persons ex vivo (Esterbauer et al., *Free Radic. Biol. Med.* 13: 341–390, 1992; Bella et al., *Arterioscler. Thromb.* 11: 1700–1711, 1991). Jialal et al. (*Arterioscler. Thromb. Vasc. Biol.,* 15: 190–198, 1995) reported that the minimum dose of all rac-α-tocopherol (administered by a gel-capsule) which can significantly decrease the susceptibility of LDL to oxidation (measured ex vivo by a lag time in the presence of oxidizing agent) is 400 IU/per day. Since LDL resistance to oxidation is a good prognostication of CHD (Jialal et al.), Applicants posed the question of whether supplementation with a moderate dose of vitamin E (200 IU/day) would significantly alter LDL susceptibility to oxidation and whether one could differentiate between natural and synthetic forms of α-tocopherol as well as the method of delivering the vitamin (dispersed in orange juice versus milk).

Method: The susceptibility of LDL to oxidation was assessed by challenging the low-density lipoprotein fraction with hemin and hydrogen peroxide according to the method of Bella et al. (*Arterioscler. Thromb.* 11: 1700–1711, 1991). Additional modifications to the method were made to increase its sensitivity for this study. The LDL was isolated by means of ultracentrifugation (Terpstra et al., *Anal. Biochem.* 111: 149–157, 1981) before and after 4 weeks of daily dosing the subjects with two 8 oz. glasses of either orange juice or milk enriched with synthetic or natural α-tocopherol at the level of 200 IU/day. The isolated LDL fraction was analyzed during a hydrogen peroxide-hemin challenge using 20 mg/dL of LDL cholesterol in a THERMO-MAX™ Microplate Reader (Molecular Devices Corporation, Menlo Park, Calif.). The time that transpired before oxidation began (lag time) was determined. The various lag times were compared (longer lag time=better LDL resistance to oxidation) and expressed in relation to the α-tocopherol/cholesterol ratio of the specific LDL sample being tested.

Results: The LDL oxidation rates from subjects consuming either form of α-tocopherol (synthetic or natural) in the enriched milks were very similar (Table 4). However, the resistance of LDL to oxidation (lag time until oxidation initiation) was at least 30% poorer, i.e., the lag time was shorter, for the group of subjects who consumed the same amount of vitamin E (200 IU/day) in orange juice (Table 4). In addition, when LDL oxidation was compared after 4 weeks of vitamin E supplementation to baseline values (week 0), the vitamin E in orange juice was only about 60% as effective as the vitamin E in milks (Table 4). Since the LDL oxidation lag times were linearly proportional to the α-tocopherol/cholesterol ratios of the LDL fractions, these data support Applicant's conclusion that vitamin E supplementation of milk will uniquely improve, i.e., reduce the risk of CHD in humans.

HUMAN CLINICAL STUDY #3

Background, Rationale and Objective: Given the results of the first two clinical studies which were based upon subjects ingesting 100 and 200 IU per day of vitamin E, Applicants wished to determine to what extent the ingestion of a substantially lower dose of vitamin E in milk, i.e., 30 IU per day (the current RDA in the U.S.), would elevate the plasma level of vitamin E. If, for example, a dose of only 30 IU per day of vitamin E microdispersed in milk were unusually effective in boosting the plasma level of the vitamin, then it might not be necessary to ingest a higher daily dose, such as 50–200 IU per day.

Accordingly, a third study was carried out to provide a vitamin B supplement dose of 30 IU per day (all-rac-α-tocopherol acetate) in milk. As in the second clinical study, the milk contained 1% fat (as a 50—50 blend of soybean oil and milkfat), and the amount of vitamin E in a serving of milk was set at half the daily dose (i.e., 15 IU per 8 ounce serving), with two servings consumed per day (morning and evening). As an additional parameter in this study, Applicants wished to determine whether excluding the vitamins A and D that are normally included in commercial milks (see "Preparation of Vitamin E-Fortified Milks" in clinical study #1), would affect vitamin E absorption.

Human subject volunteers were selected from the same pool of subjects who participated in the second clinical study. Again, each person served as their own control, thereby removing much of the variability inherent between individuals, and permitting comparison of results for individuals in this study with results for the same individuals in the first and second clinical studies. As in the previous studies, the overall plasma lipoprotein profile and the vitamin E status of individuals were monitored.

Preparation of Vitamin E-Fortified Milks: Preparation of milks, and the packaging and storage of milks by H.P. Hood, Inc. (Chelsea Mass.) were carried out as described for vitamin E-fortified milks in the first clinical study (see milk #3), except that the new milk (milk #21) was fortified with only 15 IU of all-rac-α-tocopherol acetate per serving. A portion of the milk batch was prepared without vitamins A and D (milk #20). Processing losses of vitamin E were measured and were compensated for, by including approximately a 25% excess of vitamin E in the each beverage formulation which equaled the measured processing loss.

Methods of Clinical Study #3

Subjects: Fourteen healthy male and female volunteers recruited from the Brandeis University community, and previously enrolled in the second clinical study, were re-enrolled in this study after a "wash-out" period of more than 4 weeks during which the subjects consumed no vitamin or mineral supplements.

Groups: An initial blood sample was drawn in order to assess plasma TC, LDL, HDL and TGs as well as α-tocopherol and vitamin A status. Group assignment was similar to the first and second studies except that only two groups of seven subjects per group were studied. The subjects consumed two 8 oz. glasses of milk per day (one glass with breakfast, and one with dinner), for a period of only two weeks. This milk was the same as milk #3 in the first clinical study except that the vitamin E was present at a level of 15 IU per serving rather than 50 IU. In summary, all subjects received a dosage of 30 IU per day of all-rac-α-tocopherol acetate from two servings of the milk.

Diets: Same as in the first and second clinical studies, and participants were asked to maintain their usual diets and exercise regimens.

Beverage Supply and Bookkeeping: As in the previous studies, milks were prepared by H.P. Hood, Inc. (Chelsea, Mass.) to specification. Milk was prepared as described above prior to the study, frozen in half-gallon semi-opaque containers which were stored in the dark, and thawed as needed prior to distribution to the participants. Subjects received beverages, and were monitored and interviewed for regimen compliance as in the previous studies.

Blood Analyses: After an overnight fast (12 h), 2 ml blood samples were collected at 0 and 2 wks by sterile technique, plasma was isolated, and plasma components quantitated, all as described for the first clinical study.

Results and Conclusion of Clinical Study #3

In the two week study described above, 14 human subjects received 30 IU per day of oil-dispersible all-rac-α-tocopherol acetate in two divided doses microdispersed in a 1% filled milk which contained a 50—50 blend of milkfat and soybean oil. Seven subjects in Group 1 (milk #20) received the vitamin E in milk without any vitamin A or D, and seven others in Group 2 (milk #21) received the vitamin E together with normal amounts of vitamin A and D. Comparing the results for the two groups in Table 5, there is no statistical difference between the groups with regard to vitamin E increase in the plasma, or any other lipoprotein-related measurement. For Groups 1 and 2 together, the 30 IU per day milk-borne supplement of vitamin E increased the average fasting plasma vitamin E/cholesterol ratio by approximately 22% (see Table 5). However, this 22% increase only slightly exceeds (not statistically significant) the 16% increase in the plasma vitamin E/cholesterol ratio (above a basal value) which would be achieved for a 30 IU capsule dose as interpolated from the linear portion of the data of Princen et al. (see, FIG. 1 and Arterioscler. Thromb. Vasc. Biol., 15: 325–333, 1995). This data describes the response of subjects ingesting 25, 50, 100, 200, 400, and 800 IU vitamin E (all-rac-α-tocopherol) daily in gel capsules for two weeks. This 22% increase (Applicants' measured increase) also only slightly exceeds (but not statistically significant) the 16% net increase in plasma level of vitamin E reported by KH van het Hof et al., for subjects ingesting 31 mg (34 IU) per day of all-rac-α-tocopherol in margarine.

In summary, if someone who is currently ingesting no supplementary vitamin E wishes to obtain the health benefits associated with nearly doubling his or her basal fasting ratio of vitamin E/cholesterol, this can be achieved by ingesting approximately 100 IU or more of vitamin E per day microdispersed in milk. In fact, within 4 weeks of commencing such dietary supplementation, this ratio of vitamin E/cholesterol increases approximately 92%. From FIG. 1, it is also apparent that unless the daily intake of vitamin E is at least 50 IU, there is little advantage in consuming the vitamin E microdispersed in milk. In fact, with a daily intake of only 30 IU (the current RDA for vitamin E) it is estimated that the vitamin which has been microdispersed in milk is at most only 38% more effective (22% divided by 16%=1.38) than vitamin E in capsules. At this vitamin level, any small advantage of using vitamin E in milk would be lost due to losses resulting from vitamin E degradation during processing and storage. These results at low vitamin E ingestion levels differ dramatically from the results obtained at higher doses. Therefore the major advantage of milk over capsules for delivering vitamin E is realized at daily doses over 50 IU, rather than 30 IU and below.

At this time it is unknown why ingestion of at least 50 IU per day (e.g., 50–200 IU/day) of vitamin E microdispersed in milk is 2–3 times more effective in raising the vitamin E/cholesterol ratio in the plasma than an equal dose of the viatmin ingested in a soft gel capsule, while 30 IU per day of the vitamin microdispersed in milk was not found to be better than 30 IU in a capsule at a statistically significant level. A physiological and/or metabolic explanation for this observed distinction awaits further research.

TABLE 5

Clinical Study With Milks Providing 30 IU Per Day of Vitamin E

| | Milk #20<br>(1% fat blend + syn.E)<br>(without vitamins A and D) | Milk #21<br>(1% fat blend + syn.E)<br>(with vitamins A and D) |
|---|---|---|
| Total cholesterol (mg/dL) | | |
| 0 week | 165 ± 43 | 153 ± 25 |
| 2 weeks | 162 ± 36 | 151 ± 27 |
| HDL (mg/dL) | | |
| 0 week | 50 ± 11 | 48 ± 8 |
| 2 weeks | 49 ± 13 | 49 ± 8 |
| LDL (mg/dL) | | |
| 0 week | 97 ± 39 | 89 ± 27 |
| 2 weeks | 97 ± 30 | 86 ± 24 |
| LDL/HDL (ratio) | | |
| 0 week | 2.03 ± 0.92 | 1.91 ± 0.71 |
| 2 weeks | 2.06 ± 0.75 | 1.78 ± 0.56 |
| Triglycerides (mg/dL) | | |
| 0 week | 91 ± 35 | 83 ± 33 |
| 2 weeks | 75 ± 24 | 81 ± 24 |
| Vitamin A ($\mu$g/dL) | | |
| 0 week | 40 ± 6 | 42 ± 8 |
| 2 weeks | 39 ± 8 | 43 ± 7 |
| Vitamin E ($\mu$g/dL) | | |
| 0 week | 1060 ± 197 | 1038 ± 134 |
| 2 weeks | 1312 ± 266‡ | 1208 ± 148‡ |
| Vitamin E/Cholesterol ($\mu$mol/mmol) | | |
| 0 week | 5.91 ± 1.06 | 6.15 ± 0.86 |
| 2 weeks | 7.40 ± 1.46‡ | 7.22 ± 0.73‡ |
| Δ Vitamin E/Cholesterol (% increase from 0 week) | | |
| 2 weeks | 25 ± 10 | 19 ± 14 |

Values are mean ± SD (n = 7)
‡Means in column significantly different ($p < 0.05$) from baseline (0 week) using repeated measure ANOVA and Scheffe's F-test.

Public Health and Economic Benefits. It is recognized by the scientific community that important health benefits for young and old alike can be derived from dietary supplementation with vitamin E at levels which exceed the current RDA of 30 IU (see background section above). The present invention demonstrates that it is both practical and desirable to incorporate elevated levels of vitamin E into milk, as the carrier vehicle, to dramatically increase vitamin E absorption and transport by lipoproteins in the human bloodstream. Thus, microdispersion of vitamin E in milk (and/or other dairy products) as a food staple, will ensure that a major fraction of the population receives the vitamin E-associated health benefits on a regular, preferably daily, basis. Vitamin E-fortified milk drinkers will experience both an economy and a convenience in consuming such milk. First, for each 1 IU of vitamin E microdispersed in milk above a dose of 50 IU per day, they will receive the equivalent "bioavailability benefit" of approximately 2–3 IU of oil-soluble vitamin E typically consumed in capsule form. Second, the reluctance and forgetfulness of many people to take vitamin capsules will be overcome by including the vitamin in milk.

Further to this point, an even more important benefit to public health is realized with the knowledge that the incidence of heart attacks would be reduced by ⅓ for individuals consuming the equivalent of a 400 IU or more vitamin E in a capsule (Stephens et al., Lancet, 347, 781–786, 1996; Losonczy et al., Am. J. Clin. Nutr. 64, 190–196, 1996). From the present invention, the functionally equivalent vitamin E level for a 400 IU vitamin E capsule would be from 100 to 200 IU per day from milk. Using current estimates of the annual incidence of heart attacks in the U.S. (approximately 650,000) and realizing that the average cost of immediate treatment, hospitalization and aftercare for a typical heart attack is approximately $25,000, the estimated annual cost-savings for the health care aspect alone for a ⅓ reduction in heart attacks would be 5.4 billion dollars! By comparison, if the entire older half of the U.S. population, ie., approximately 140 million people, were supplemented on a continuous basis with 200 IU of synthetic vitamin E microdispersed in milk (vitamin E cost=0.8 cents for 200 IU in bulk, per person per day), the annual cost of vitamin E for ½ of the U.S. population would be approximately 400 million dollars. From these statistics, the cost-effectiveness of distributing vitamin E under the present invention to reduce the incidence of heart attacks in the U.S., would be 13-fold less than the direct medical cost of dealing with those heart attacks had they occurred (0.4 billion versus 5.4 billion dollars). These numbers do not even include the lost productivity associated with the absence from work, which could easily double the cost burden, bringing the total cost-savings from this vitamin E supplementation approach to more than 50% of the total U.S. government budget devoted to medical research! Applicants believe that these startling economics should provide the rationale and impetus for the Food and Drug Administration to work with the dairy industry to fortify milk products with from 50 to 200 or 50 to 100 IU vitamin E per serving.

All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to carry out the objects and obtain the ends and advantages mentioned, as well as those inherent therein. The specific methods and compositions described herein as presently representative of preferred embodiments are exemplary and are not intended as limitations on the scope of the invention. Changes therein and other uses will occur to those skilled in the art which are encompassed within the spirit of the invention are defined by the scope of the claims.

It will be readily apparent to one skilled in the art that varying substitutions and modifications may be made to the invention disclosed herein without departing from the scope and spirit of the invention. For example, those skilled in the art will recognize that the invention may suitably be practiced using any of a variety of sources of vegetable oils in the described blends.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is not intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group. For example, if there are alternatives A, B, and C, all of the following possibilities are included: A separately, B separately, C separately, A and B, A and C, B and C, and A and B and C. Thus, the embodiments expressly include any subset or subgroup of those alternatives, for example, any subset of the types of fatty acids or vegetable oils. While each such subset or subgroup could be listed separately, for the sake of brevity, such a listing is replaced by the present description.

While certain embodiments and examples have been used to describe the present invention, many variations are possible and are within the spirit and scope of the invention. Such variations will be apparent to those skilled in the art upon inspection of the specification, drawings and claims herein.

Other embodiments are within the following claims.

What is claimed is:

1. A method for providing a composition suitable for reducing the daily ingested dose of vitamin E required for achieving at least a 50% increase over the basal fasting plasma vitamin E/cholesterol ratio measured in the plasma of human subjects previously consuming no vitamin E dietary supplements, comprising microdispersing vitamin E in a milk product at a concentration sufficient to provide between 50 and 400 IU vitamin E per serving of said milk product measured after normal processing of said milk product; and processing and packaging said milk product to provide a consumer-ready milk product, wherein the beneficial reduction in the amount of vitamin E required for achieving said at least 50% increase when ingested in said milk product, compared to the amount of vitamin E required to achieve said increase when ingested in a pharmaceutical preparation, is at least 1.5-fold greater than the loss of vitamin E incurred during processing of said milk product.

2. The method of claim 1, wherein said vitamin E is a fat soluble vitamin E and is distributed in fat particles, wherein at least 90% of said fat particles are less than 2 microns in diameter.

3. A food-based vitamin E delivery system for achieving and sustaining a doubling of the basal fasting vitamin E/cholesterol ratio measured in the plasma of human subjects previously consuming no vitamin E dietary supplements, comprising a milk product fortified with between 50 and 200 IU per serving of microdispersed vitamin E, thereby providing a bioavailability-enhanced and cost-effective amount of supplemental vitamin E, wherein daily ingestion of an amount of said milk product sufficient to provide a dose of 100 IU achieves and sustains said doubling.

4. The food-based vitamin E delivery system of claim 3, wherein the daily dose of supplemental vitamin E microdispersed in said milk product, and required to achieve and sustain said doubling is ⅓ to ½ of the amount which otherwise would be required to achieve and sustain said doubling when ingested daily in the form of a capsule or pill.

5. The food-based vitamin E delivery system of claim 3, wherein said vitamin E is a fat soluble vitamin E and is distributed in fat particles, wherein at least 90% of said fat particles are less than 2 microns in diameter.

6. A cost-effective method for doubling the basal fasting vitamin E/cholesterol ratio in the plasma of human subjects previously consuming no vitamin E dietary supplements, comprising providing a milk product fortified with between 50 and 200 IU per serving of microdispersed vitamin E ingesting and continuing to ingest daily an amount of the milk product sufficient to provide at least 90 IU of vitamin E.

7. The method of claim 6, wherein the doubling of the basal fasting vitamin E/cholesterol ratio causes a decrease in the rate of LDL cholesterol oxidation in the bloodstream, thereby reducing the risk of atherosclerosis and coronary heart disease.

8. A method for improving the economy of utilizing supplemental vitamin E in the human diet, comprising providing and ingesting daily, a sufficient amount of a milk product containing 50 to 200 IU per serving of microdispersed vitamin E to provide at least 50 IU daily rather than ingesting 2–3 times said at least 50 IU daily in capsule form.

9. The method of claim 8, wherein said milk product provides a 2–3-fold increase in bioavailability over the capsule form of vitamin E, such that the increase in bioavailability outweighs the losses in vitamin E activity during processing and storage of said milk product.

10. The method of claim 8, wherein said vitamin E is a fat soluble vitamin E and is distributed in fat particles, wherein at least 90% of said fat particles are less than 2 microns in diameter.

11. A milk product comprising at least 40 IU of vitamin E per serving of said product, wherein said product can provide at least 100 IU of vitamin E per day to an individual ingesting between one and three servings of said product, wherein said vitamin E is uniformly microdispersed throughout said product, and wherein ingestion of said at least 100 IU of vitamin E per day in said product is sufficient to cause the fasting plasma vitamin E/cholesterol ratio in human subjects to be elevated at least 50% above the basal fasting vitamin E/cholesterol ratio measured in the same subjects consuming no vitamin E dietary supplements.

12. The milk product of claim 11, wherein said product is selected from the group consisting of whole milk, reduced fat milk, low-fat milk, skim milk, vegetable oil-filled milk, blended vegetable oil and milkfat-filled milk, lactose-reduced milk, butter milk, flavored milk, dairy product-containing beverages, yogurt, cream, sour cream, ice cream, cream cheese, cottage cheese, hard and soft cheeses, processed cheese, butter and butter-containing spreads, puddings, egg nog, powdered and reconstituted milk, concentrated milk, condensed milk, and milk-based infant formula.

13. The milk product of claim 11, wherein ingestion of said 100 IU of vitamin E in said product is sufficient to cause the fasting plasma vitamin E/cholesterol ratio to be elevated at least 60% above the basal fasting vitamin E/cholesterol ratio measured in said same subjects consuming no vitamin E dietary supplements.

14. The milk product of claim 11, wherein ingestion of said 100 IU of vitamin E in said product is sufficient to cause the fasting plasma vitamin E/cholesterol ratio to be elevated at least 80% above the basal fasting vitamin E/cholesterol ratio measured in said same subjects consuming no vitamin E dietary supplements.

15. The milk product of claim 11, wherein said product comprises between 100 IU and 400 IU of vitamin E per serving of said product.

16. The milk product of claim 11, wherein ingestion of said 100 IU of vitamin E per day in said product is sufficient to cause said fasting plasma vitamin E/cholesterol ratio to be elevated above said basal fasting vitamin E/cholesterol ratio to at least that ratio measured for subjects ingesting 200 IU of vitamin E each day in the form of a pharmaceutical supplement or dispersed in orange juice.

17. The milk product of claim 16, wherein said pharmaceutical supplement is orally ingested each day as either a single or a divided dosage, and is selected from the group consisting of capsules, pills, powders, and liquid preparations of vitamin E.

18. The milk product of claim 11, wherein ingestion of said 100 IU of vitamin E per day in said product is sufficient to cause said fasting plasma level of vitamin E to be elevated between approximately 700 and 1000 micrograms per deciliter (16–23 $\mu$mol per liter) above the basal fasting level of vitamin E measured in the same subjects.

19. The milk product of claim 11, wherein the elevated fasting plasma level of vitamin E is between 1700 and 2000 micrograms per deciliter of vitamin E.

20. The milk product of claim 11, wherein the chemical form of said vitamin E in said milk product is selected from the group consisting of all-rac-$\alpha$-tocopherol acetate, all-rac-$\alpha$-tocopherol, RRR-$\alpha$-tocopherol acetate, RRR-$\alpha$-tocopherol, and combinations thereof.

21. The milk product of claim 20, wherein the physical form of said vitamin E in said milk is selected from the group consisting of water-dispersible and oil-dispersible preparations.

22. The milk product of claim 11, or claim 21, wherein the portion of said product throughout which said vitamin E is uniformly microdispersed, is selected from the group consisting of the fat portion, the fat-free milk portion, and combinations thereof.

23. The milk product of claim 11, wherein said product comprises a milkfat-containing cream portion, and an oil-dispersible preparation of vitamin E microdispersed throughout said cream portion and throughout said product.

24. The milk product of claim 11, wherein said product is a filled milk product which also comprises a vegetable oil-containing cream portion, which optionally also includes milkfat, and an oil-dispersible preparation of vitamin E which is microdispersed throughout said cream portion and throughout said product.

25. The milk product of claim 11, wherein said product is fat-free, and comprises a water-dispersible preparation of vitamin E which is microdispersed throughout said product.

26. The product of claim 11, wherein ingestion of said at least 100 IU of vitamin E per day in said product for at least 4 weeks causes the plasma ratio of vitamin E to total cholesterol to be at least doubled over the basal plasma ratio of vitamin E to total cholesterol measured in the same subjects consuming no vitamin E dietary supplements.

27. The milk product of claim 26, wherein said basal plasma ratio is between 5 and 6 micromoles of vitamin E per millimole of cholesterol, and the elevated plasma ratio is at least between 9 and 10 micromoles of vitamin E per millimole of cholesterol.

28. The milk product of claim 11, wherein said vitamin E is a fat soluble vitamin E and is distributed in fat particles, wherein at least 90% of said fat particles are less than 2 microns in diameter.

29. A milk product comprising at least 31 IU of vitamin E per serving of said product, wherein said vitamin E is microdispersed throughout said product, and wherein daily ingestion of said milk product causes an increase in the fasting plasma vitamin E/cholesterol ratio at least two-fold greater than that elevation achieved by daily ingestion of the same quantity and chemical species of vitamin E packaged in the form of a pharmacological capsule or pill measured in the same subjects not otherwise consuming a dietary vitamin E supplement.

30. The milk product of claim 29, comprising at least 50 IU per serving of said milk product.

31. The milk product of claim 29, wherein said vitamin E is a fat soluble vitamin E and is distributed in fat particles, wherein at least 90% of said fat particles are less than 2 microns in diameter.

32. A method for elevating the fasting plasma vitamin E/cholesterol ratio at least 50% in human subjects, comprising the steps of:

providing a milk product comprising at least 50 IU of vitamin E per serving of said product, wherein said product provides at least 100 IU of vitamin E per day to an individual ingesting between 1 and 2 servings of said product and wherein said vitamin E is uniformly microdispersed throughout said product, and ingesting said at least 100 IU of vitamin E in said product per day, for at least 2 weeks to cause the fasting plasma vitamin E/cholesterol ratio to be elevated at least 50% above the basal fasting vitamin E/cholesterol ratio measured in the same subjects consuming no vitamin E dietary supplements.

33. The method of claim 32, wherein said ingesting said at least 100 IU of vitamin E in said product per day, for at least 2 weeks causes said fasting plasma vitamin E/cholesterol ratio to be elevated at least 60%.

34. The method of claim 32, wherein said ingesting said at least 100 IU of vitamin E in said product per day, for at least 2 weeks causes said fasting plasma vitamin E/cholesterol ratio to be elevated at least 80%.

35. The method of claim 32, wherein said vitamin E is a fat soluble vitamin E and is distributed in fat particles, wherein at least 90% of said fat particles are less than 2 microns in diameter.

36. A method for reducing the incidence of non-fatal heart attacks by at least 50% in subjects having normal vitamin E uptake, and also having coronary atherosclerosis, comprising the steps of:

providing a milk product comprising at least 50 IU of vitamin E per serving of said product, wherein said product provides at least 100 IU of vitamin E per day to an individual ingesting between 1 and 2 servings of said product, wherein said vitamin E is uniformly microdispersed throughout said product, ingesting said at least 100 IU of vitamin E in said product per day for at least 2 weeks to cause the fasting plasma vitamin E/cholesterol ratio to be elevated at least 50% above the basal fasting vitamin E/cholesterol ratio measured in the same subjects consuming no vitamin E dietary supplements, and continuing said ingesting for 200 days and indefinitely beyond, after which said 200 days, said reducing becomes apparent.

37. The method of claim 36, wherein said vitamin E is a fat soluble vitamin E and is distributed in fat particles, wherein at least 90% of said fat particles are less than 2 microns in diameter.

38. A method for beneficially fortifying a milk product with a defined quantity and chemical form of vitamin E, comprising microdispersing at least 31 IU of vitamin E per serving throughout said milk product, wherein daily ingestion of an amount of said milk product sufficient to provide a dose of at least 50 IU vitamin E causes an increase in the fasting plasma vitamin E/cholesterol ratio which is at least two-fold greater than that increase caused by daily ingestion of the same quantity and chemical form of vitamin E packaged in the form of a pharmacological capsule or pill.

39. The method of claim 38, wherein at least 50 IU of vitamin E per serving is microdispersed throughout said milk product.

40. The method of claim 38, wherein said chemical form of said vitamin E in said milk product is selected from the group consisting of all-rac-α-tocopherol acetate, all-rac-α-tocopherol, RRR-α-tocopherol acetate, and RRR-α-tocopherol.

41. The method of claim 38, wherein said milk product is selected from the group consisting of regular milkfat-containing milk; fat-free skim milk, vegetable oil containing filled milk, and combinations thereof.

42. The method of claim 38, wherein said vitamin E is a fat soluble vitamin E and is distributed in fat particles, wherein at least 90% of said fat particles are less than 2 microns in diameter.

43. A method for substantially equalizing ing the bioavailability to humans of synthetic vitamin E and natural vitamin E, comprising providing a milk product containing at least 31 IU of microdispersed synthetic or natural vitamin E per serving of said milk product, wherein ingestion of said milk product produces at least a 50% increase in the plasma vitamin E/cholesterol ratio over the basal fasting plasma vitamin E/cholesterol ratio measured in the plasma of human subjects previously consuming no vitamin E dietary supplements.

44. A method for substantially equalizing the protective effect of synthetic vitamin E and natural vitamin E against LDL oxidation, comprising providing a milk product containing at least 31 IU of microdispersed synthetic or natural vitamin E per serving of said milk product, wherein ingestion of said milk product produces at least a 50% increase in the plasma vitamin E/cholesterol ratio over the basal fasting plasma vitamin E/cholesterol ratio measured in the plasma of human subjects previously consuming no vitamin E dietary supplements.

\* \* \* \* \*